United States Patent
Choi et al.

(10) Patent No.: US 11,084,575 B2
(45) Date of Patent: Aug. 10, 2021

(54) ROTOR HUB VIBRATION ATTENUATOR

(71) Applicant: Bell Helicopter Textron, Inc., Fort Worth, TX (US)

(72) Inventors: Jouyoung Jason Choi, Southlake, TX (US); David Heverly, Arlington, TX (US); Michael Seifert, Southlake, TX (US); Michael Smith, Colleyville, TX (US); Frank Bradley Stamps, Colleyville, TX (US); Thomas Parham, Jr., Colleyville, TX (US); Amarjit Olenchery Kizhakkepat, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 71 days.

(21) Appl. No.: 16/084,970

(22) PCT Filed: Mar. 14, 2017

(86) PCT No.: PCT/US2017/022380
§ 371 (c)(1),
(2) Date: Sep. 13, 2018

(87) PCT Pub. No.: WO2017/209827
PCT Pub. Date: Dec. 7, 2017

(65) Prior Publication Data
US 2020/0001987 A1     Jan. 2, 2020

Related U.S. Application Data

(63) Continuation-in-part of application No. 15/350,073, filed on Nov. 13, 2016, now Pat. No. 10,562,617.
(Continued)

(51) Int. Cl.
B64C 27/00    (2006.01)
F16F 7/116    (2006.01)
F16F 15/14    (2006.01)

(52) U.S. Cl.
CPC ............ *B64C 27/001* (2013.01); *F16F 7/116* (2013.01); *B64C 2027/003* (2013.01); *F16F 15/14* (2013.01)

(58) Field of Classification Search
CPC ............ B64C 27/001; B64C 2027/003; B64C 2027/005; F16F 15/14; F16F 15/1337; F16F 7/116
See application file for complete search history.

(56) References Cited

U.S. PATENT DOCUMENTS 3,219,120 A     11/1965   Hooper
3,920,202 A  *  11/1975   Mouille ............... B64C 27/001
                                                244/17.27
(Continued)

FOREIGN PATENT DOCUMENTS

WO     2011137417 A2    3/2011
WO     2014113114 A2    7/2014
(Continued)

OTHER PUBLICATIONS

European Search Report in related European Application No. 17807149.4 dated Mar. 1, 2019, 4 pages.
(Continued)

*Primary Examiner* — Richard A Edgar
*Assistant Examiner* — Jackson N Gillenwaters
(74) *Attorney, Agent, or Firm* — Lightfoot & Alford PLLC

(57)     ABSTRACT

A vibration attenuation system for attenuating vibrations in a mast of an aircraft includes a weight attached to the mast but free to orbit about the mast. The weight can be com-
(Continued)

prised of one or more weight assemblies. Embodiments can include a single weight, or plural weight assemblies wherein each weight assembly can include a mechanical interconnecting mechanism so that each weight assembly receives feedback regarding the position and movement of one or more other weight assemblies. Each weight can be associated with a spring that urges the weight towards a neutral position. Rotation of the mast can cause the weight to orbit about the mast and self-excite such that the weight acts against the urging of the spring towards an attenuating position.

12 Claims, 41 Drawing Sheets

Related U.S. Application Data

(60) Provisional application No. 62/456,646, filed on Feb. 8, 2017, provisional application No. 62/308,012, filed on Mar. 14, 2016.

(56) References Cited

U.S. PATENT DOCUMENTS

| | | | |
|---|---|---|---|
| 4,403,681 A | 9/1983 | Desjardins | |
| 4,550,812 A * | 11/1985 | Mard | B64C 27/001 |
| | | | 188/379 |
| 5,456,341 A | 10/1995 | Garnjost et al. | |
| 5,647,726 A | 7/1997 | Sehgal et al. | |
| 5,954,480 A * | 9/1999 | Schmaling | B64C 27/001 |
| | | | 416/145 |
| 6,045,090 A | 4/2000 | Krysinsky et al. | |
| 7,118,328 B2 | 10/2006 | Welsh et al. | |
| 7,448,854 B2 | 11/2008 | Jolly et al. | |
| 7,942,633 B2 | 5/2011 | Jolly et al. | |
| 8,021,115 B2 | 9/2011 | Welsh | |
| 8,162,606 B2 | 4/2012 | Jolly et al. | |
| 8,267,652 B2 | 9/2012 | Jolly et al. | |
| 8,313,296 B2 | 11/2012 | Jolly et al. | |
| 8,403,643 B2 | 3/2013 | Welsh | |
| 8,435,002 B2 | 5/2013 | Jolly et al. | |
| 8,454,315 B2 | 6/2013 | Welsh | |
| 8,474,745 B2 | 7/2013 | Popelka et al. | |
| 9,073,627 B2 | 7/2015 | Jolly et al. | |
| 9,139,296 B2 | 9/2015 | Popelka et al. | |
| 10,113,609 B2 * | 10/2018 | Buesing | F16F 15/04 |
| 10,577,090 B2 * | 3/2020 | Lauder | B64D 35/02 |
| 2006/0222505 A1 | 10/2006 | Sehgal et al. | |
| 2011/0268573 A1 | 11/2011 | Girard et al. | |
| 2014/0360830 A1 * | 12/2014 | Heverly | B64C 11/008 |
| | | | 188/378 |
| 2015/0203196 A1 | 7/2015 | Heverly, II et al. | |
| 2016/0325828 A1 * | 11/2016 | Jolly | F16F 15/223 |

FOREIGN PATENT DOCUMENTS

| | | |
|---|---|---|
| WO | 2015031768 A1 | 3/2015 |
| WO | 2015031826 A1 | 3/2015 |

OTHER PUBLICATIONS

European Exam Report in related European Application No. 17807149.4 dated Mar. 14, 2019, 8 pages.
International Search Report in related PCT Application No. PCT/US2017/0022380 dated Nov. 21, 2017, 5 pages.
Written Opinion in related PCT Application No. PCT/US2017/0022380 dated Nov. 21, 2017, 2 pages.
European Exam Report in related European Application No. 17807149.4 dated Sep. 25, 2019, 7 pages.
European Exam Report in related European Application No. 17807149.4 dated Aug. 20, 2020, 4 pages.
European Exam Report in related European Application No. 17807149.4 dated May 18, 2020, 4 pages.

* cited by examiner

US 11,084,575 B2

ROTOR HUB VIBRATION ATTENUATOR

CROSS-REFERENCE TO RELATED APPLICATIONS

This disclosure claims the benefit of the filing date of U.S. Provisional Patent Application Ser. No. 62/308,012, filed on 14 Mar. 2016 and titled ROTOR HUB VIBRATION ATTENUATOR, U.S. patent application Ser. No. 15/350,073, filed on 13 Nov. 2016 and titled ROTOR HUB VIBRATION ATTENUATOR, and U.S. Provisional Patent Application Ser. No. 62/456,646, filed on 8 Feb. 2017 and titled SPINNING-MASS VIBRATION-REDUCTION SYSTEM. The entire content of each of these applications is hereby expressly incorporated by reference.

TECHNICAL FIELD

This disclosure relates to vibration attenuation devices.

BACKGROUND

Rotary-wing aircraft, such as helicopters and tiltrotors, have at least one rotor for providing lift and propulsion forces, and these rotors have at least two airfoil blades connected to a rotatable hub. The rotor blades cause vibrations that are a function of the rotational speed of the rotor, and aircraft designers have difficulty accurately predicting the exact vibration modes that a particular rotor configuration will encounter. The vibrations can be transmitted through the rotor mast, through associated powertrain components, and into the airframe of the aircraft. The vibrations can reduce the life of affected components and cause undesirable vibrations for passengers. Various types of vibration attenuation systems have been developed to reduce or eliminate these vibrations. The conventional systems can include airframe-mounted vibration attenuators and at least one mast-mounted system.

Prior active and passive systems act at a specific point on the airframe to reduce vibrations, and this can result in amplified vibrations in other locations on the airframe. However, a passive mast-mounted rotating balancer for vibration reduction was disclosed in U.S. Pat. No. 3,219,120 and in an American Helicopter Society paper entitled, "UREKA-A Vibration Balancing Device for Helicopters" (January 1966, Vol. 11, No. 1). The UREKA (Universal Rotor Excitation Kinematic Absorber) device uses heavy rollers which revolve in a circular steel track to create an oscillatory force to minimize vibration. The rollers are free to rotate and position themselves relative to the position of the rotor, and the rollers will automatically achieve the correct position to minimize vibration if the mast attachment point possesses specific dynamic characteristics. However, the UREKA system only prevents an imbalance of the rotor at the 1/rev frequency, and does not oppose other rotor-induced n/rev vibrations. The dynamic characteristics necessary for proper operation of the prior art is basically that of a supercritical shaft. If the mast attachment point does not possess these characteristics, then the UREKA device could amplify vibration rather that attenuate it and will not respond to n/rev vibrations where n is greater than 1. In addition, since the position of the rollers is governed by the motion of the mast attachment point, the device is susceptible to gusts and other transients that may disturb the roller position, creating a vibration transient.

For application to tiltrotors, where large changes in gross weight and rotor rotational speed are present, the UREKA device may not function properly, as the dynamic characteristics of the mast attachment point would vary considerably. The V-22 tiltrotor, for example, has dynamic characteristics which prevent the use of the UREKA design.

Hub shear pendulums have been used but they are heavy and only attenuate approximately 50% of the n/rev vibration that they are tuned to cancel.

BRIEF DESCRIPTION OF THE DRAWINGS

Prior Art

Prior Art

DETAILED DESCRIPTION

Figure 1:
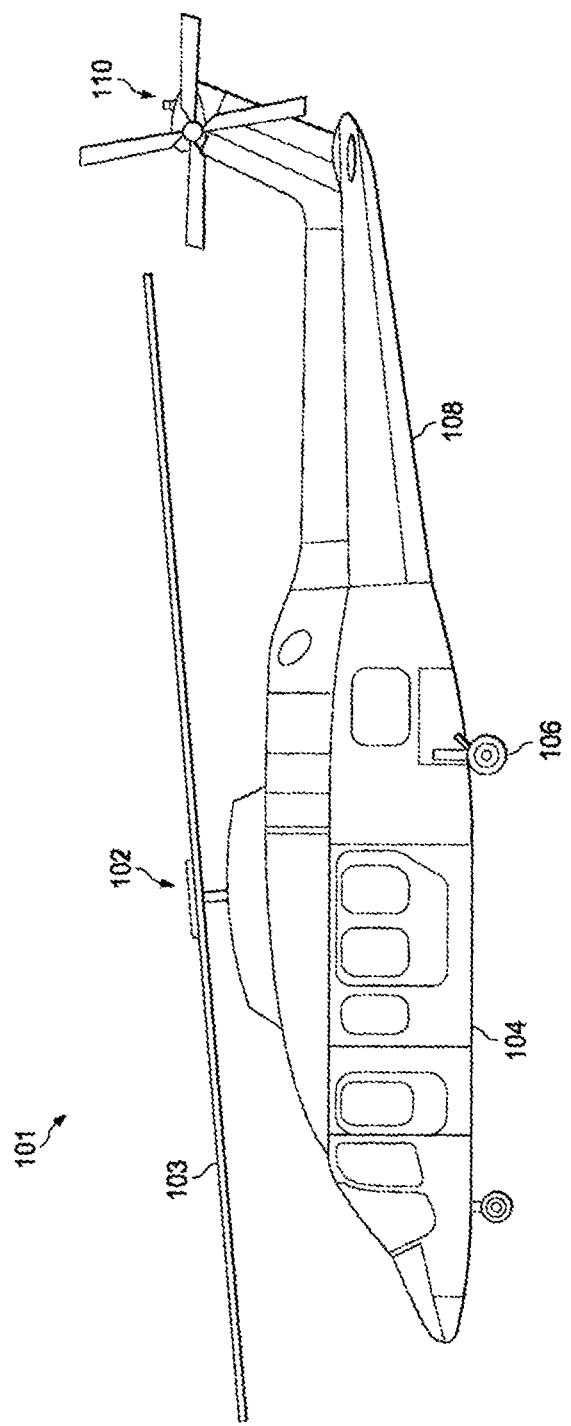
FIG. 1 shows a view of an aircraft having a vibration attenuation system according to the present disclosure.

Illustrative embodiments of the system and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The vibration attenuator system disclosed herein includes a rotorcraft hub-mounted vibration-reduction device with revolving spring mass(es) that represents an improvement over traditional hub Frahm, hub pendulum, or active spinning mass vibration devices. The disclosed vibration attenuator system has a base frame that is attached to a hub supporting one or more springs that, in turn, connect to a central mass. That collection of parts revolves with the hub. The centrally located mass moves in a plane containing its center of gravity and is normal to the mast center line. The mass moves in a circular path that varies in radius proportionally with the N/REV vibration magnitude and is phased 180 degrees from the said N/REV vibration, and counteracts the hub vibration. The mass orbits at N/REV, which is a higher rotational frequency than the 1/REV motion of the base frame, resulting in a steady extension or contraction motion in the spring length in response to any changes in the magnitude of the steady state N/REV Hub vibrations. The Hub vibrations maintain an approximately steady state magnitude and phase that is only affected by changes in the flight path of the aircraft. The disclosed vibration attenuator system includes a set of bearings between the base frame and the spring(s), which allows the spring(s) to rotate along with the mass, while maintaining the same tuning and physical function and changes the approximately steady state spring deformations to spring motions. Changing the spring deformations allows the weight to greatly change the operating radius of the mass which allows for a much greater force output with the same spring design.

Advantageously, unlike prior vibration attenuation systems, embodiments of the disclosed vibration attenuator system provides for vibration attenuation without the need for springs that are attached on one end to a moving weight and on the other end attached to a stationary frame that does not rotate relative to the mast.

Referring now to FIG. 1 in the drawings, a rotorcraft 101 is illustrated. Rotorcraft 101 has a rotor system 102 with a plurality of rotor blades 103. The pitch of each rotor blade 103 can be selectively controlled in order to selectively control direction, thrust, and lift of rotorcraft 101. Rotorcraft 101 further includes a fuselage 104, a landing gear system 106, an empennage 108, and an anti-torque system 110. Rotorcraft 101 can also include a vibration attenuator system as described further herein.

Figure 2:
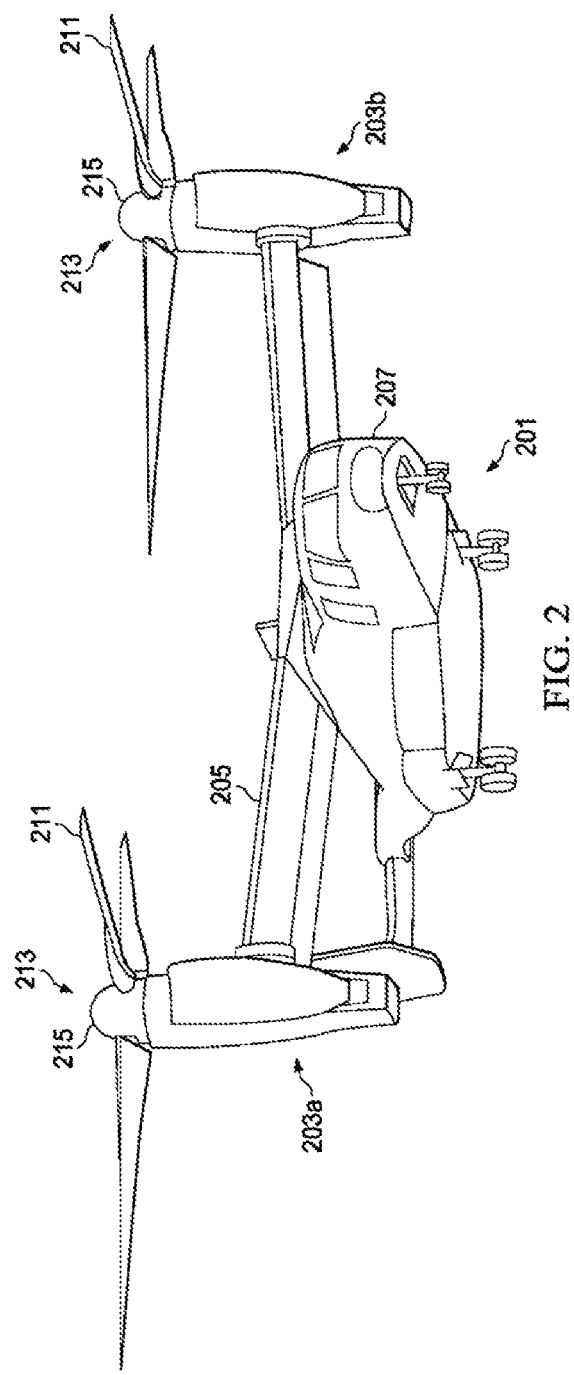
FIG. 2 shows a view of a tiltrotor aircraft having a vibration attenuation system according to the present disclosure.

FIG. 2 shows an oblique view of a rotorcraft 201 having a vibration attenuator system, which is described further herein. Rotorcraft 201 is a rotary-wing aircraft, specifically a tiltrotor aircraft, having a fuselage 207 and wings 205 extending from fuselage 207. Fuselage 207 and wings 205 comprise the airframe of aircraft 201. Rotatable nacelles 203a and 203b are located at the outer end of each wing 205 for housing an engine (not shown), and each engine is configured for providing torque to cause rotation of an attached proprotor assembly 213. Each proprotor assembly 213 has a plurality of rotor blades 211, which are connected to a hub located beneath an aerodynamic fairing, referred to as a spinner 215.

It should be appreciated that rotorcraft 101 and 201 are merely illustrative of a variety of aircraft that can implement the embodiments of the vibration attenuator systems disclosed herein. Other aircraft implementations can include hybrid aircraft, unmanned aircraft, gyrocopters, and a variety of helicopter configurations, to name a few examples. It should be appreciated that even though aircraft are particularly well suited to implement the embodiments of the present disclosure, non-aircraft vehicles and devices may also implement the embodiments.

Figure 3:
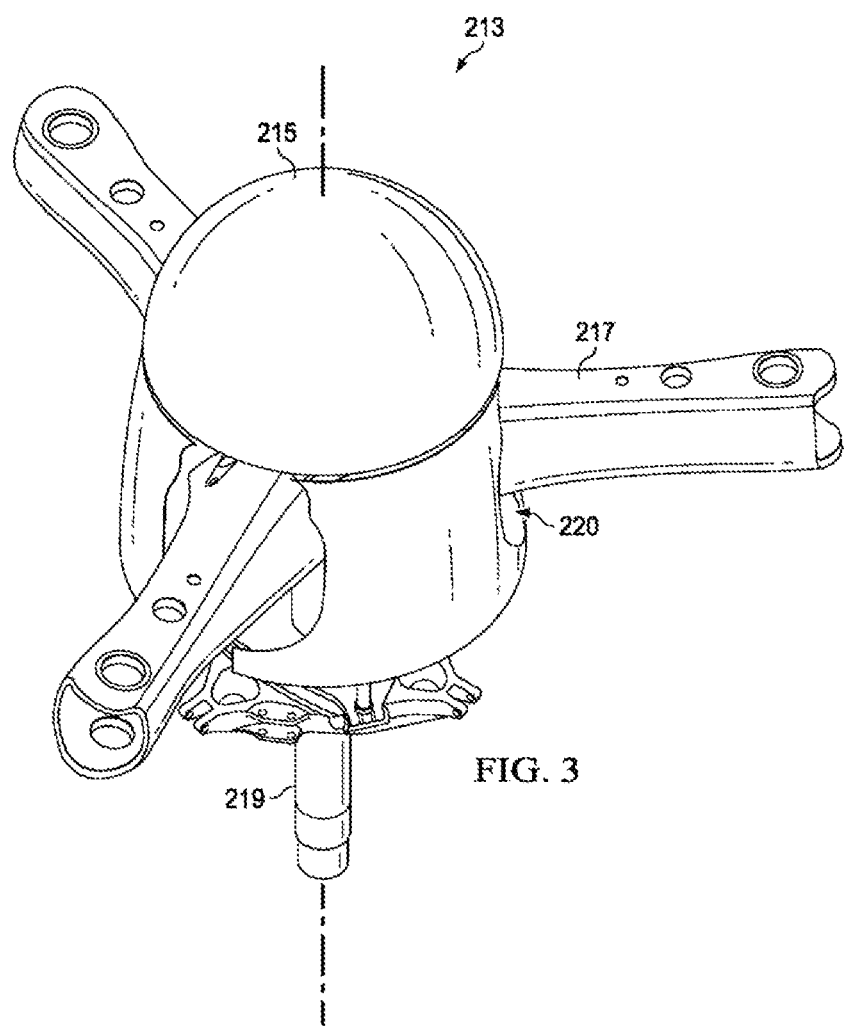
FIG. 3 shows an isolated, oblique view of a portion of a proprotor assembly that includes a vibration attenuation system according to the present disclosure.

FIG. 3 is an isolated, oblique view of a portion of a proprotor assembly 213. The proprotor assembly 213 comprises a grip and yoke assembly 217 for securing rotor blades 211 (shown in FIG. 2) to a mast 219. Holes 220 are formed in spinner 215 for allowing portions of the yoke assembly 217 to protrude for attachment of blades 211. The mast 219 is connected to an output of the engine (not shown) for transfer of torque from the engine to mast 219.

Figure 4:
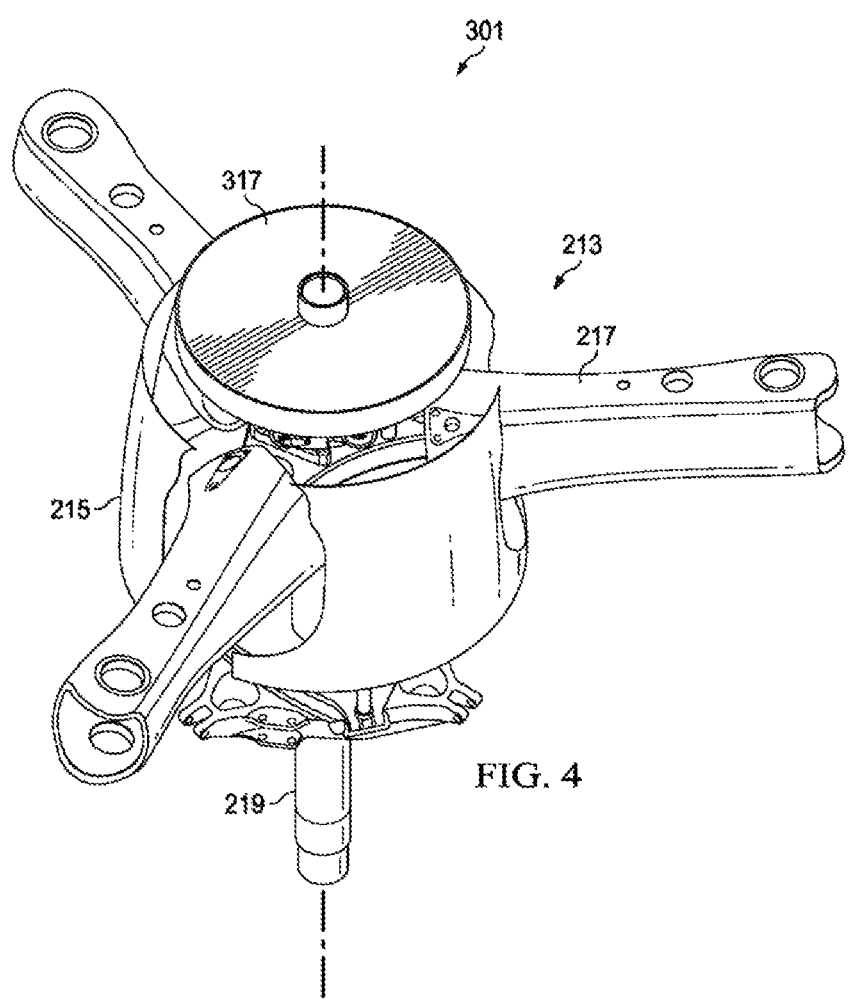
FIG. 4 shows the vibration attenuation system shown in FIG. 3, but with a cut-away view of the spinner.
Figure 5:
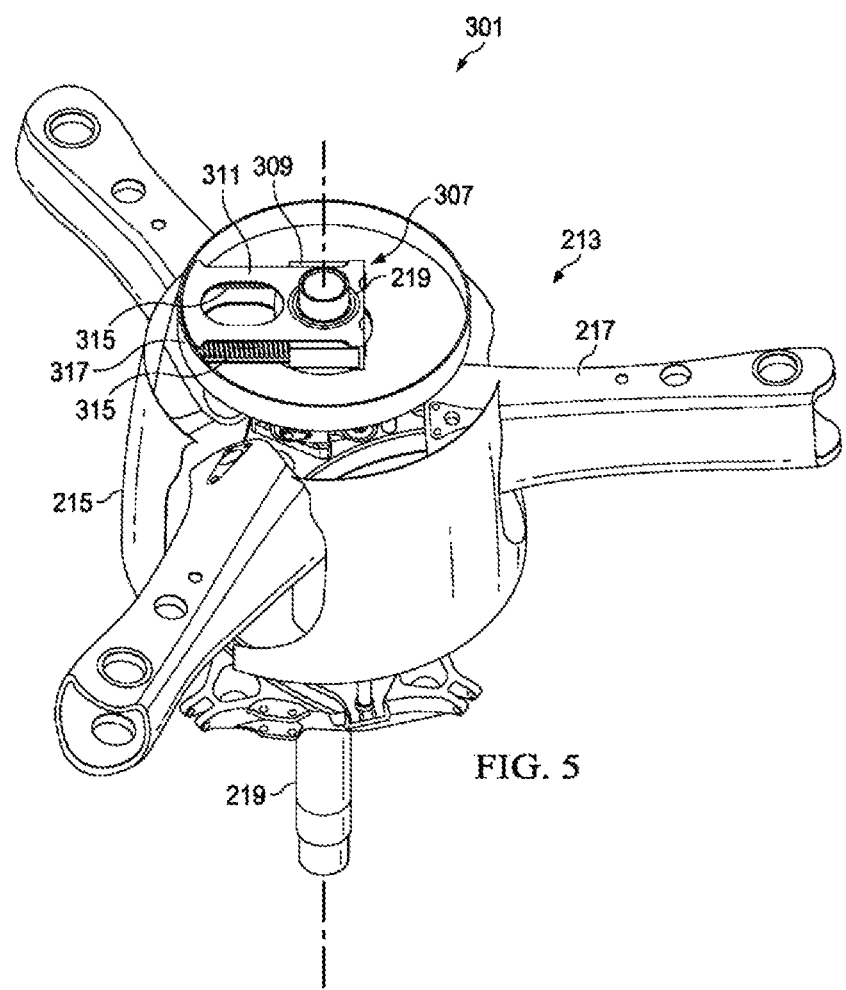
FIG. 5 shows the vibration attenuation system shown in FIG. 3, but with a cut-away view of the spinner and a cut-away view of the vibration attenuation assembly.

Referring now also to FIGS. 4 and 5, FIG. 4 shows the proprotor assembly 213 with a cut-away view of the spinner 215, and FIG. 5 shows the proprotor assembly 213 with a cut-away view of the spinner 215 and a cut-away view of the vibration attenuation assembly 301. As shown in FIG. 4, the vibration attenuation assembly 301 is connected to the mast 219 for rotation with the mast 219 and grip and yoke assembly 217. In the configuration shown, vibration attenuation assembly 301 is carried on an end portion of mast 219.

As shown in FIG. 5, the vibration attenuation assembly 301 comprises an adjustable weight assembly 307, which is configured to rotate relative to mast 219 about the longitudinal axis of mast 219. Weight assembly 307 has at least one weight 309 that is movably attached to weight support 311 for positioning the weight radially to the mast center line along tracks 313 (best shown in FIGS. 8-10) during operation of proprotor 213. This configuration allows for weight 309 to move to any position between an inner radial position, which provides for minimal or no shear forces as weight 309 spins, and an outer position, which provides for maximum shear forces. Compression springs 315 extend along respective tracks 313 and urge the weight 309 away from an outer radial region of the vibration attenuation assembly 301 and towards the mast 219. Springs 315 are selected to allow for self-excitation of the weight 309 at a desired N/REV frequency, resulting in the weight 309 self-positioning between the inner and outer positions in order to counteract the magnitude of the N/REV vibrations of the mast 219.

Figure 6:
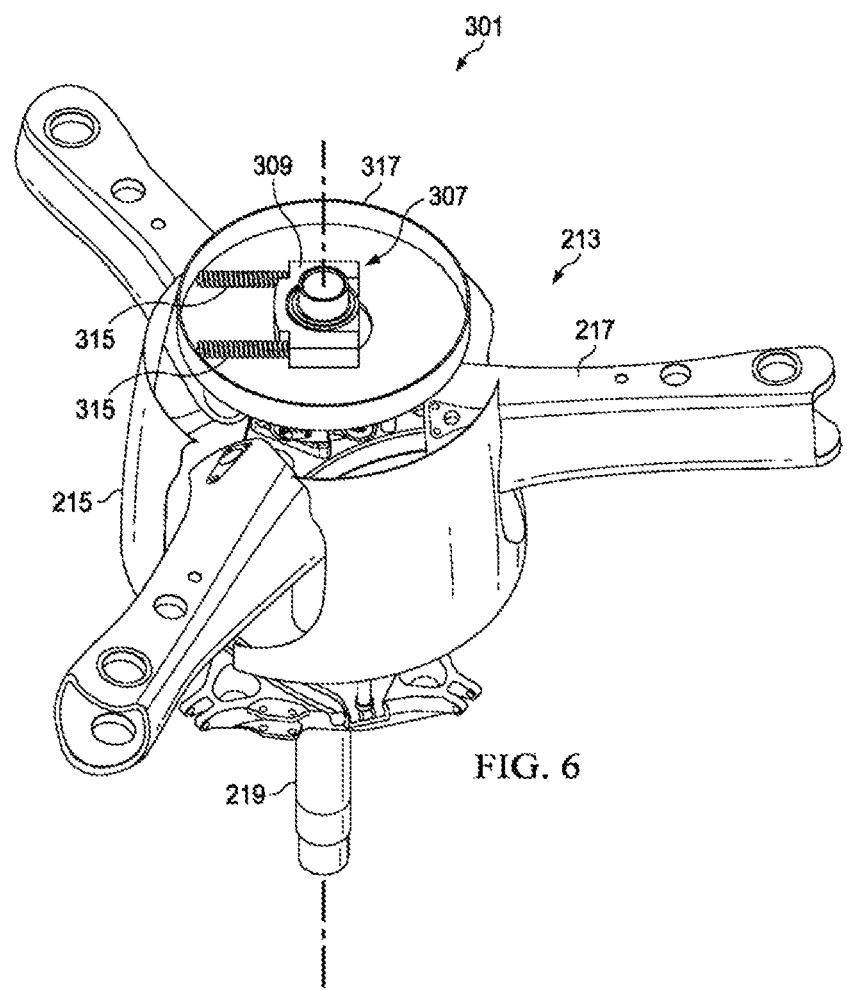
FIG. 6 shows the vibration attenuation system shown in FIG. 3, but with a cut-away view of the spinner and without components of the vibration attenuation assembly for clarity.
Figure 9:
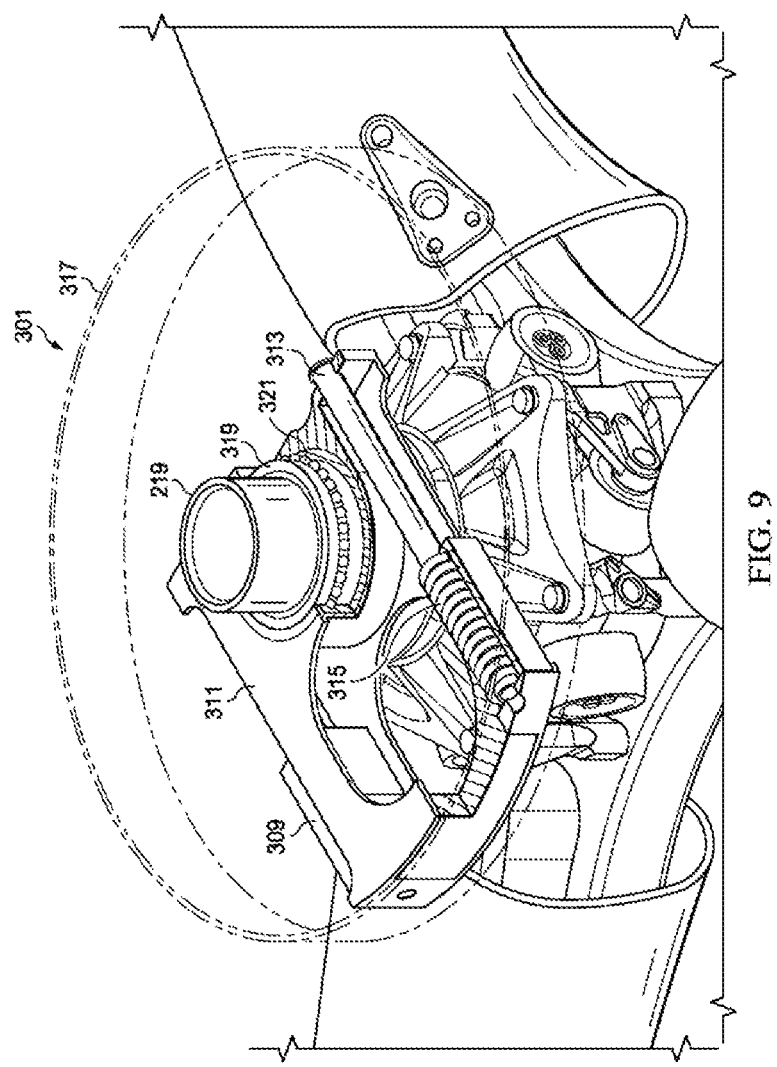
FIGS. 9 and 10 show enlarged views of the vibration attenuation system shown in FIG. 3, but with portions of components thereof removed for clarity and with the weight thereof at an outer position.
Figure 10:
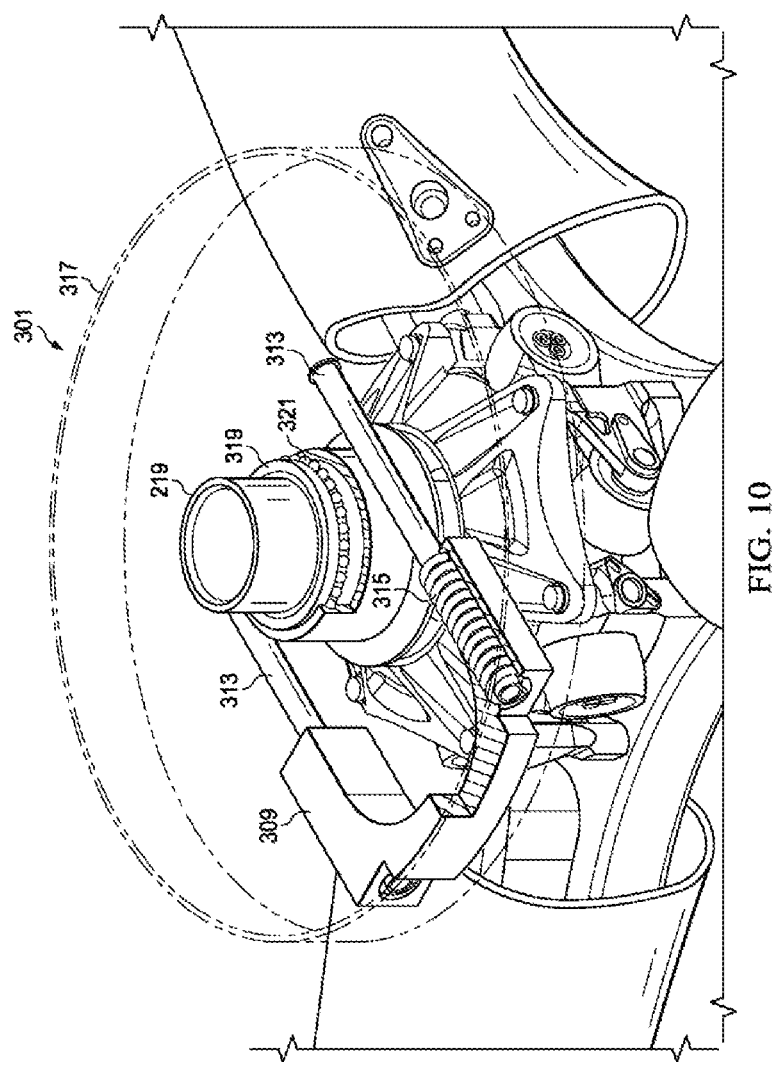
Figure 11:
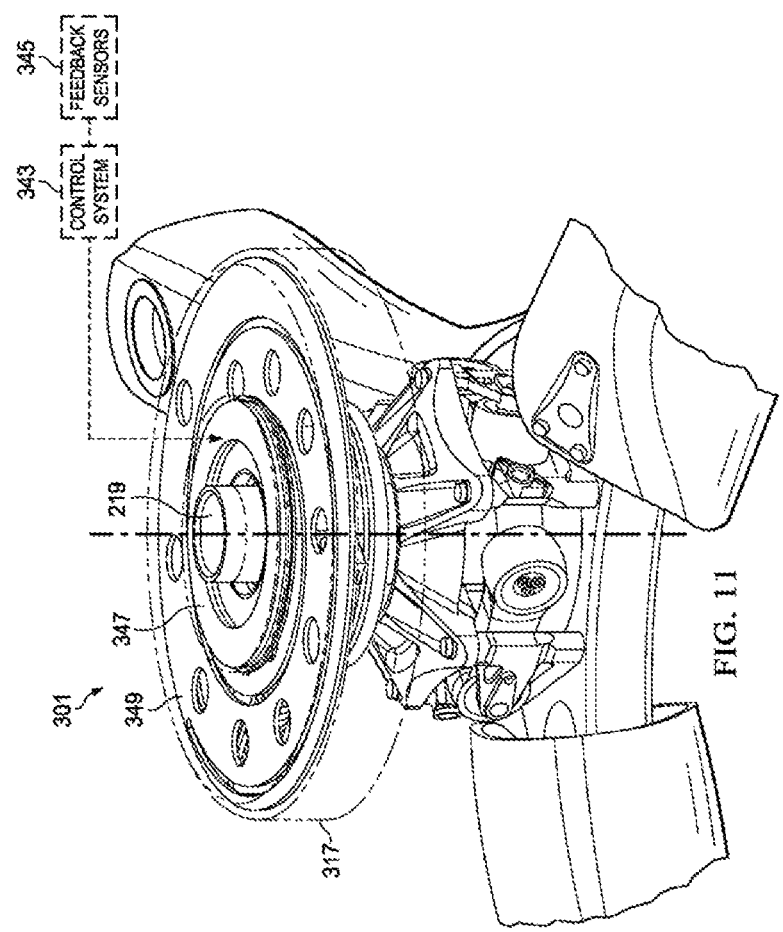
FIG. 11 shows an isolated, upper-perspective view of a portion of a proprotor assembly that includes an alternative embodiment of a vibration attenuation system according to the present disclosure.
Figure 12:
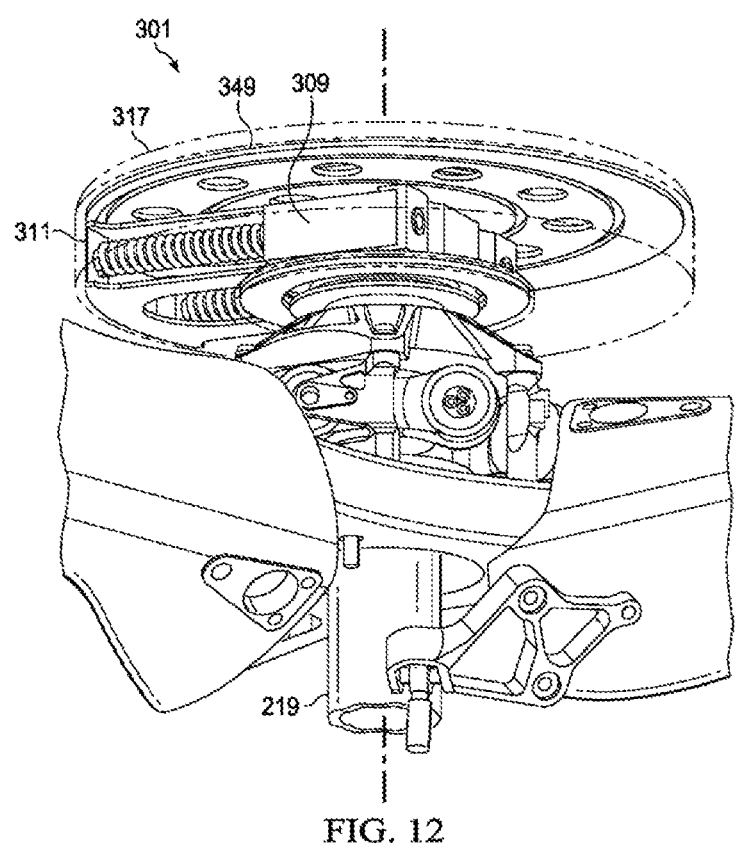
FIG. 12 shows a lower-perspective view of the vibration attenuation system shown in FIG. 11.

FIG. 6 shows proprotor 213 with weight 309 at an inner position for little or no force output with the support 311 and tracks 313 removed for clarity. FIGS. 9 and 10 show proprotor 213 with weight 309 at an outer position.

Figure 7:
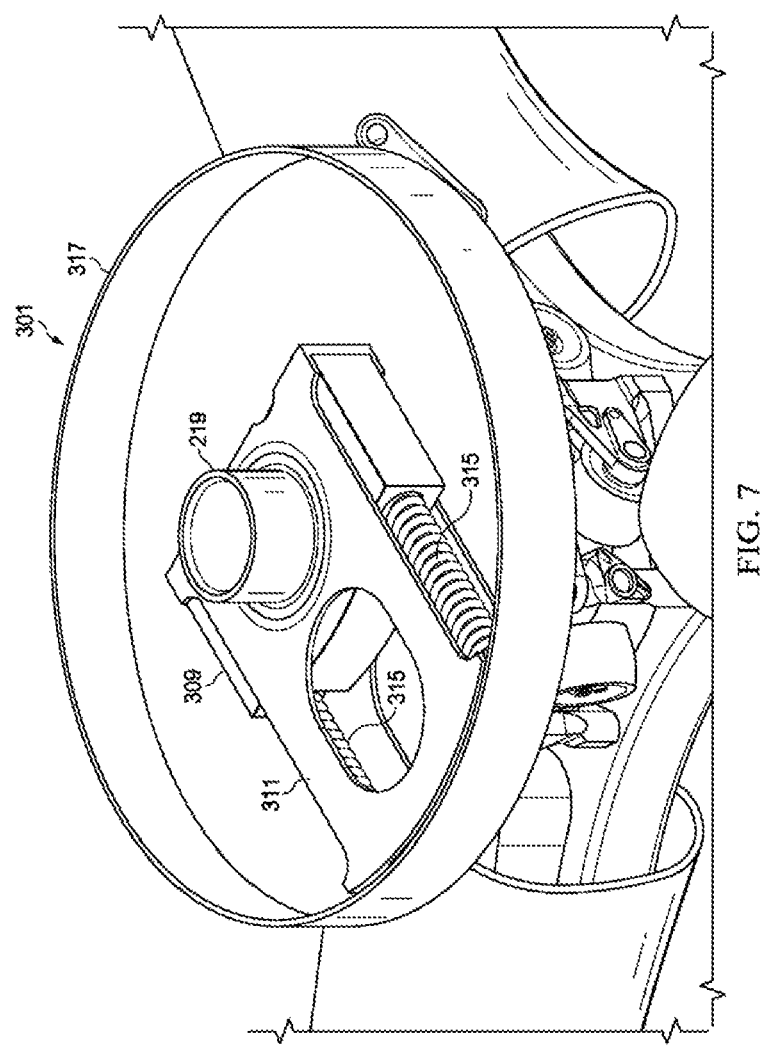
FIGS. 7 and 8 show enlarged views of the vibration attenuation system shown in FIG. 3, but with portions of components thereof removed for clarity and with the weight thereof at an inner position.

FIG. 7 shows an enlarged view of the vibration attenuation assembly 301 with a portion of the support 311 removed for clarity. The support 311 resides within a housing 317 that is fixed to rotate with the mast 219. The entire housing 317 is shown in FIG. 4, but the top of the housing 317 is removed in FIG. 7 for clarity.

Figure 8:
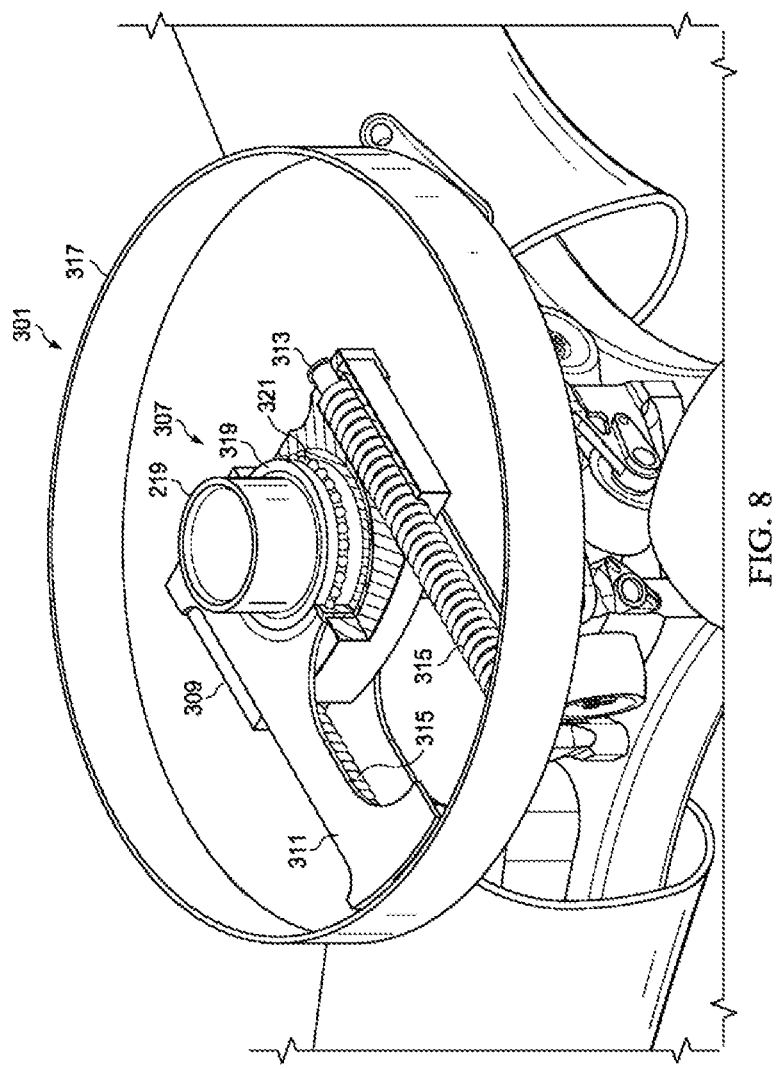

FIG. 8 shows an additional cut-away view of the support 311, showing an inner race 319 that is fixed to the mast 219, and bearings 321 that interpose the inner race 319 and the support 311. The race 319 and bearings 321 allow the weight assembly 307 to rotate freely about the mast 219. The weight assembly 307 is therefore free to orbit in response to the N/REV mast vibrations, which is a higher rotational frequency than the 1/REV rotational motion of the mast 219, while the weight 309 self-positions against the urging of the springs 315 between the inner and outer radial positions, resulting in a steady state extension and contraction motion in the spring length that serve to position the weight 309 creating a vibration that attenuates the N/REV vibrations in the mast 219.

FIGS. 9 and 10 show additional cut-away views of the vibration attenuation assembly 301 with weight 309 at an outer position which generates the maximum N/REV counter force in the weight system.

Turning next to FIGS. 11-14, in some embodiments, a control system 343 can be provided on the aircraft for controlling the parameters of operation of vibration attenuator 301, including the positioning of weight 309, speed of rotation, direction of rotation, and phasing of the shear forces relative to the position of the rotor and mast.

The control system 343 can be a microprocessor-based control system located, for example, in the fuselage. The control system 343 preferably comprises one or more feedback sensors, such as feedback sensors 345 located on the aircraft, such as on the hub, yoke, mast, fuselage, crew seats, wings, and/or nacelles, to provide vibration feedback data. Use of feedback sensors 345 allows control system 343 to control the operation of vibration attenuator system 301 based on measurements of vibrations transmitted into and through the airframe. This allows the system to reduce the resultant aircraft vibration rather than just minimizing the hub vibration. Changing the net magnitude and phase of the N/REV vibrations in the mast can create a counter vibration that when combined with the vibrations at other locations results in the desired global vibration treatment. Control system 343 may alternatively control operation of vibration attenuator 301 based on other data, such as airspeed, rotor speed, blade pitch angle, nacelle angle, amount of rotor thrust, and/or similar parameters.

Figure 13:
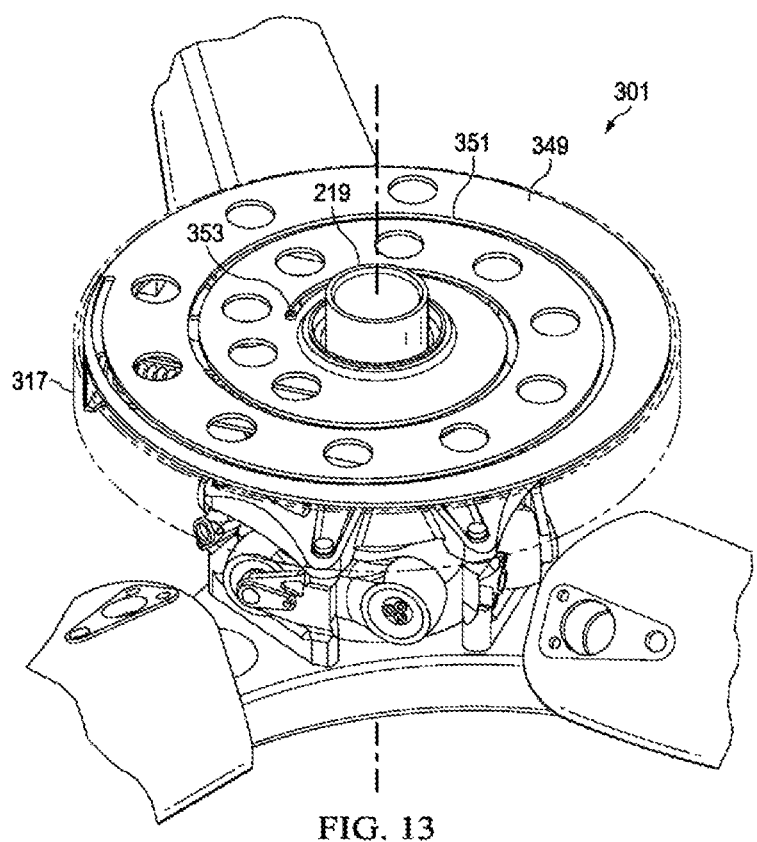
FIG. 13 shows an enlarged view of the vibration attenuation system shown in FIG. 11, but with components thereof removed for clarity.
Figure 14:
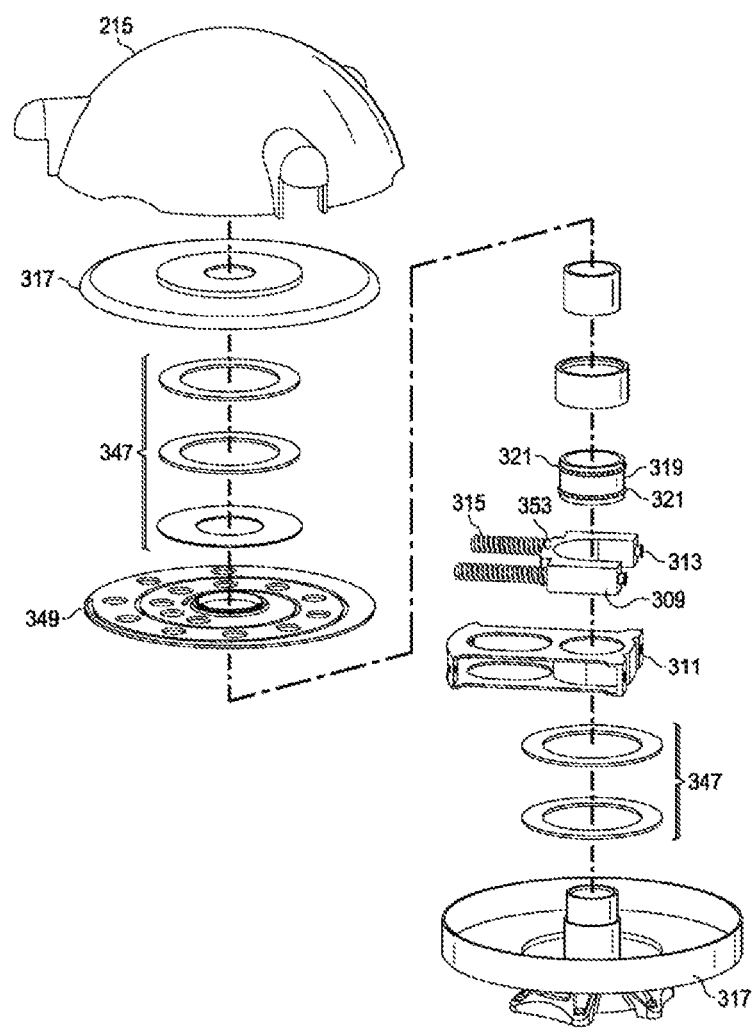
FIG. 14 shows an exploded view of the vibration attenuation system shown in FIG. 11.

Operational control preferably includes controlling the radial position of the weight 309 between the inner and outer positions in order to counteract vibrations in the mast 219. Control system 343 provides control signals to motor 347, which in turn drives the rotational position of slotted disk 349. The slotted disk 349 includes a spiraling slot 351. As shown in FIG. 13, where the motor 347 is not shown for clarity, the pin 353, which is fixed to the weight 309, extends from the weight 309 towards the disk 349 and into the slot 351. Thus, as the motor 347 rotates the disk 349, the radial position of the pin 353 and the weight 309 is changed relative to the mast 219. Motor 347 drives the angular phase position of support 311 relative to the mast and drives the angular position of disk 349 to determine the angular position and radius of the weight 309 relative to the mast 219 to create the counter N/REV vibration.

Control system 343 and/or vibration attenuator 301 may be provided with "fail-off" features to prevent vibration attenuator 301 from inducing unintended and undesirable vibrations in the event of failure of one or more components of the vibration attenuation system. If the radial position of the weight 309 is jammed in an undesired position the motor that spins support 311 can turn the weight at −1/rev which will cause the weight 309 to stop moving relative to the airframe which will make the counter vibration output to go to zero. If the motor that turns support 311 fails, the weight 309 can be moved by motor 347 on disk 349 to the most inward position, which reduces the counter vibration to zero. Inputs to control system may include aircraft gross weight, load factor, altitude, airspeed, and rpm. In addition, control system 343 may be optimized for use on tiltrotor aircraft 201 by also basing commands on the angle of nacelles 203 and other tiltrotor-specific parameters. Use of control system 343 to control vibration attenuator 301 means that attenuator 301 is less susceptible to transients, such as gusts, than prior UREKA systems and is not dependent on the dynamic characteristics of the mast. Also, since the vibration attenuator 301 can be proportionally self-exciting as described above in connection with FIGS. 3-10, the self-exciting mode can be engaged in the event of a failure in the control system 343; similarly, the control system 343 can be used in the event of a failure in the self-excitation mode of the vibration attenuator 301.

Turning next to FIGS. 15-18, an alternative embodiment is shown of a vibration attenuator 401. From a theoretical standpoint, the vibration attenuator 401 operates to attenuate vibrations in the mast 219 in a manner similar to that described in connection with vibration attenuator 301. Like the vibration attenuator 301, the vibration attenuator 401 is disposed within a housing 317 that is fixed to the mast 219, and therefore rotates with the mast 219. Also like the vibration attenuator 301, the vibration attenuator 401 includes a resultant weight and spring rate that can rotate relative to the mast 219 for countering vibrations in the mast 219; however, unlike the vibration attenuator 301, the vibration attenuator 401 includes plural weights: weight assemblies 403 and 405. Each of the weight assemblies 403 and 405 is associated with a respective one of torsion springs 407 and 409, which urge the weight assemblies toward the positions shown in FIG. 15.

Also, the weight assemblies 403 and 405 include a mechanical interconnecting mechanism so that each weight assembly receives feedback regarding the position of the other weight, and the rotational motion of each weight takes into account the activity of the other weight. The weight assemblies 403 and 405 along with springs 407 and track 413 create a system that functions like the weight 309 and the springs 315 in vibration attenuation assembly 301. In the illustrated embodiment, each of the weight assemblies 403 and 405 includes a respective extension portion 410 and 411, and a respective guide slot 413 and 415. The extension portion 410 extends between the mast 219 and an armature 423. The extension portion 411 extends between the mast 219 and an armature 425. The armature 423 is fixed to the weight assembly 403 and extends to and into the guide slot 415 of the weight assembly 405, and the armature 425 is fixed to the weight assembly 405 and extends to and into the guide slot 413 of the weight assembly 403.

The armature 423 is rotatable relative to the extension portion 410, and the armature 425 is rotatable relative to the extension portion 411. However, the spring 407 urges the armature 423 to rotate in a first direction relative to the extension portion 410, where the first direction is counterclockwise in the top-down view shown in FIG. 15. Also, the spring 409 urges the armature 425 to rotate in a second direction relative to the extension portion 411, where the second direction is clockwise in the top-down view shown in FIG. 15. Thus, the springs 407 and 409 both urge the distal ends of respective armatures 423 and 425 towards the mast 219. The guide slots 413 and 415 each define arc-shaped paths that extend between a first end that is relatively closer to the mast 219 and a second end that is relatively further from the mast 219. Thus, since the armatures 423 and 425 have fixed lengths, the rotation of the armature 423 relative to the extension portion 410 causes the second weight assembly 405 to rotate about the mast 219, and similarly the rotation of the armature 425 relative to the extension portion 411 causes the first weight assembly 403 to rotate about the mast 219. In this way, the weight assemblies 403 and 405 are mechanically linked by the armatures 423 and 425.

The weight assemblies 403 and 405 are free to orbit at N/REV, which can be a higher rotational frequency than the 1/REV motion of the mast 219. As the weight assemblies 403 and 405 rotate about the mast 219, the weight assemblies 403 and 405 will tend to position themselves as vibrations occur in the mast 219 against the urging of the springs 407 and 409 between the position shown in FIG. 15, where the two weights are about 180 degrees apart from each other, and the position shown in FIG. 18, where the two weights are somewhat aligned with each other, resulting in oscillatory extension and contraction motions in the spring length that serve to attenuate vibrations in the mast 219.

In some embodiments, a control system such as control system 343 described above can be provided on the aircraft for controlling the parameters of operation of vibration attenuator 401, including the positioning of weight assemblies 403 and 405, speed of rotation, direction of rotation, and phasing of the shear forces relative to the position of the rotor. As described above, the control system 343 can be a microprocessor-based control system located, for example, in the fuselage. The control system 343 preferably comprises feedback sensors, such as feedback sensors 345 located on the aircraft, such as on the fuselage, wings, and/or nacelles, to provide vibration feedback data. Use of feedback sensors 345 allows control system 343 to control the operation of vibration attenuator system 401 based on measurements of vibrations transmitted into and through the airframe. Control system 343 may alternatively control operation of vibration attenuator 401 based on other data, such as airspeed, rotor speed, blade pitch angle, nacelle angle, amount of rotor thrust, and/or similar parameters.

Figure 15:
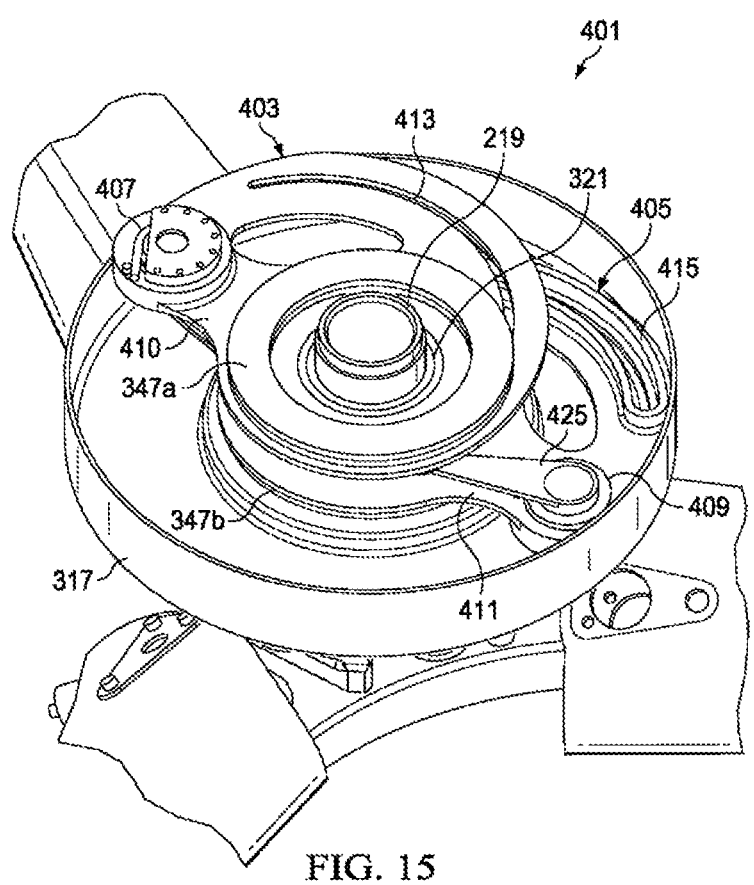
FIG. 15 shows an isolated, upper-perspective view of a portion of a proprotor assembly that includes an alternative embodiment of a vibration attenuation system according to the present disclosure.
Figure 16:
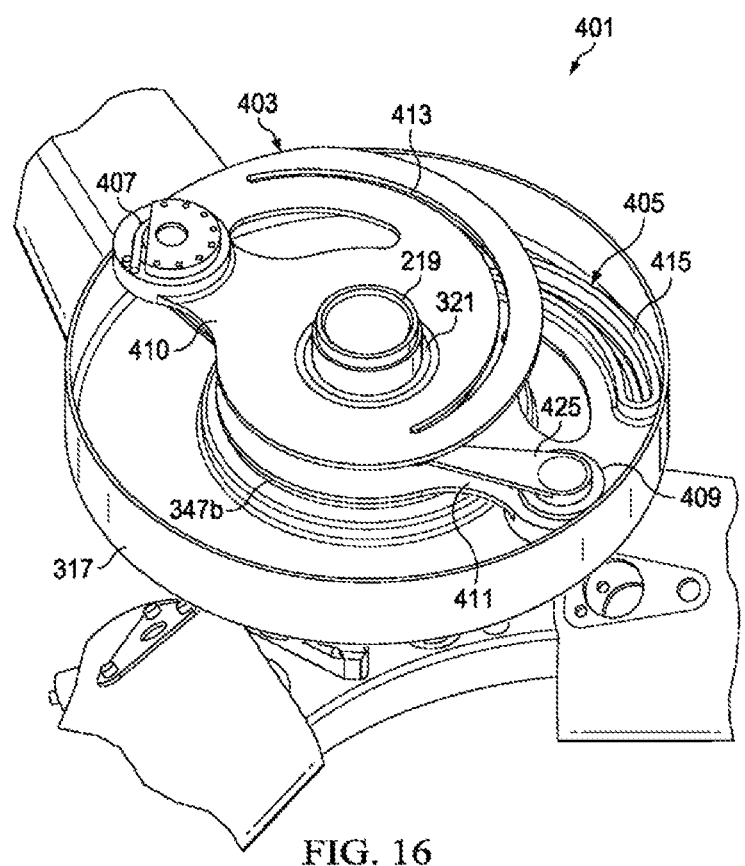
FIGS. 16-18 show enlarged views of the vibration attenuation system shown in FIG. 15, but with components thereof removed for clarity.
Figure 17:
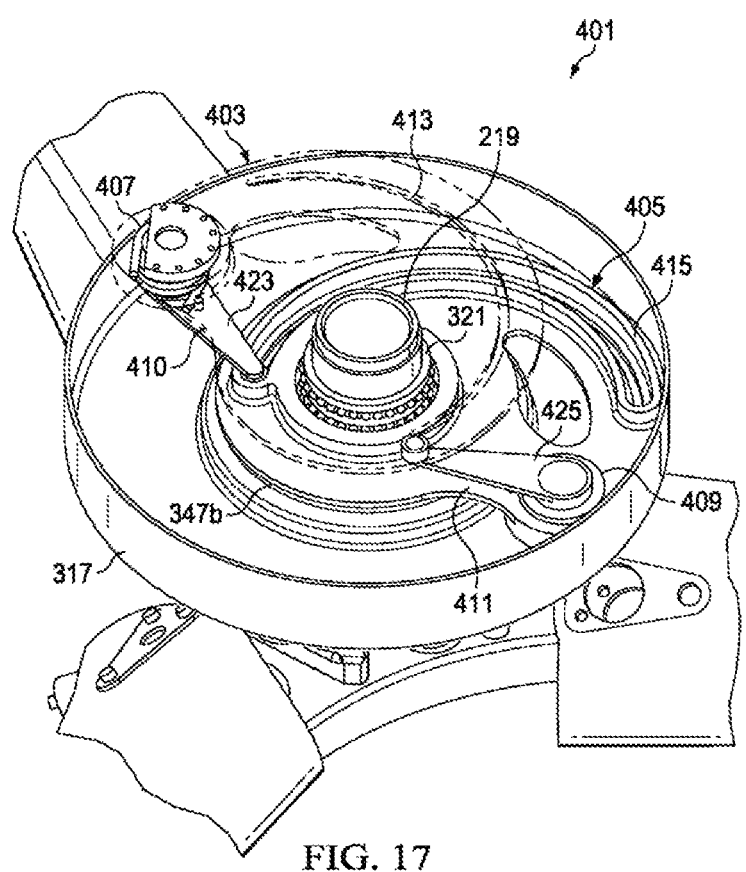
Figure 18:
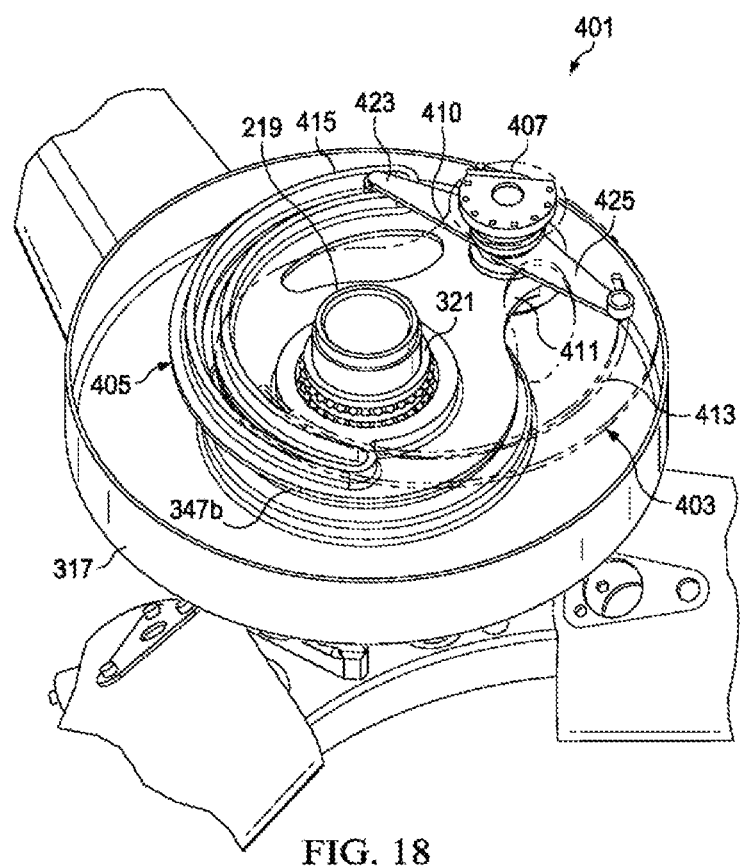
Figure 19:
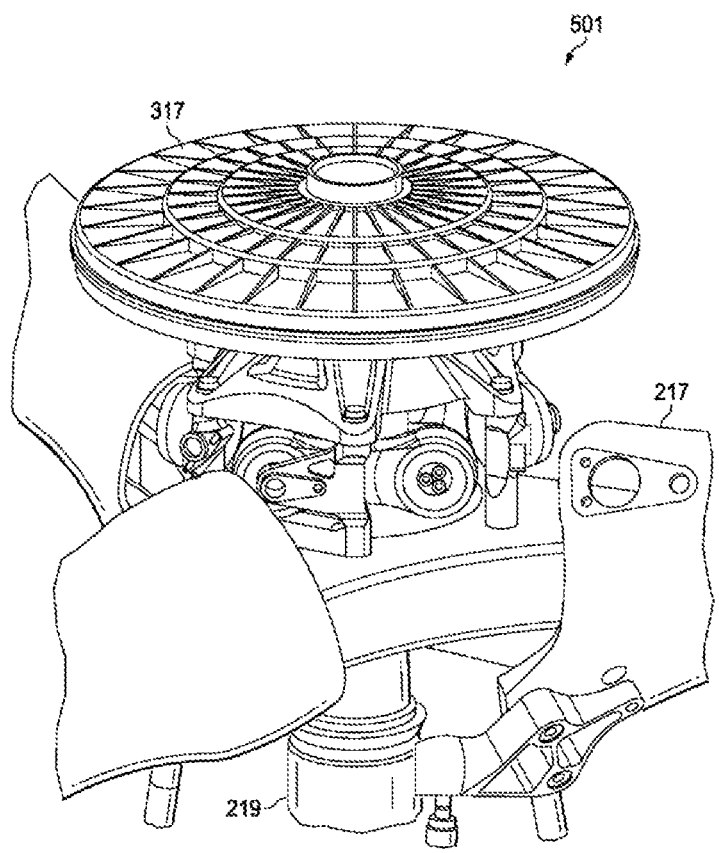
FIG. 19 shows an isolated, upper-perspective view of a portion of a proprotor assembly that includes an alternative embodiment of a vibration attenuation system according to the present disclosure.
Figure 20:
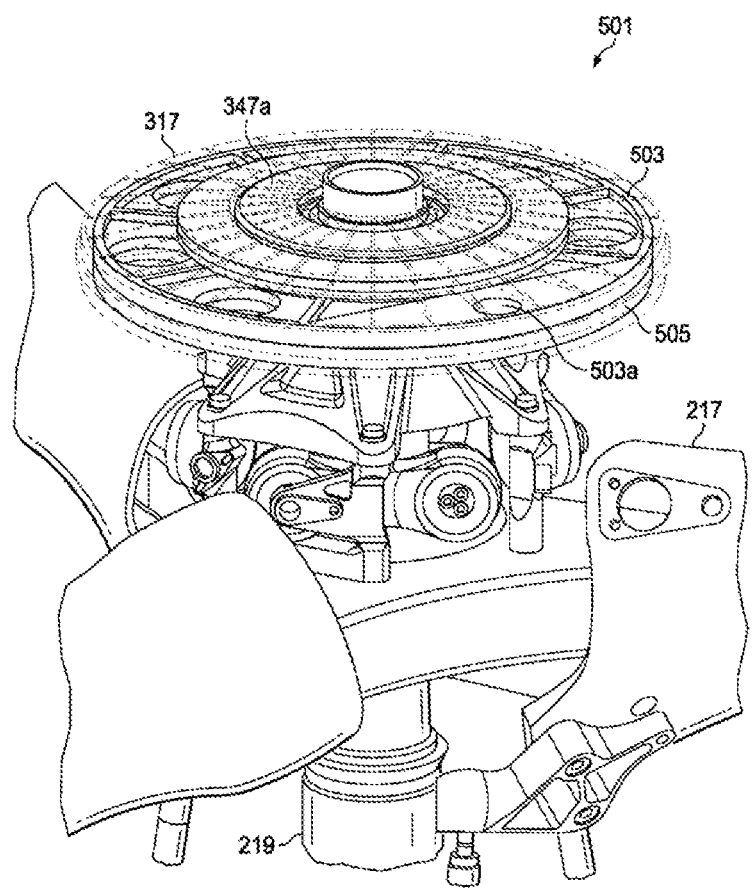
FIG. 20 shows an enlarged view of the vibration attenuation system shown in FIG. 19, but with components thereof removed for clarity.
Figure 21:
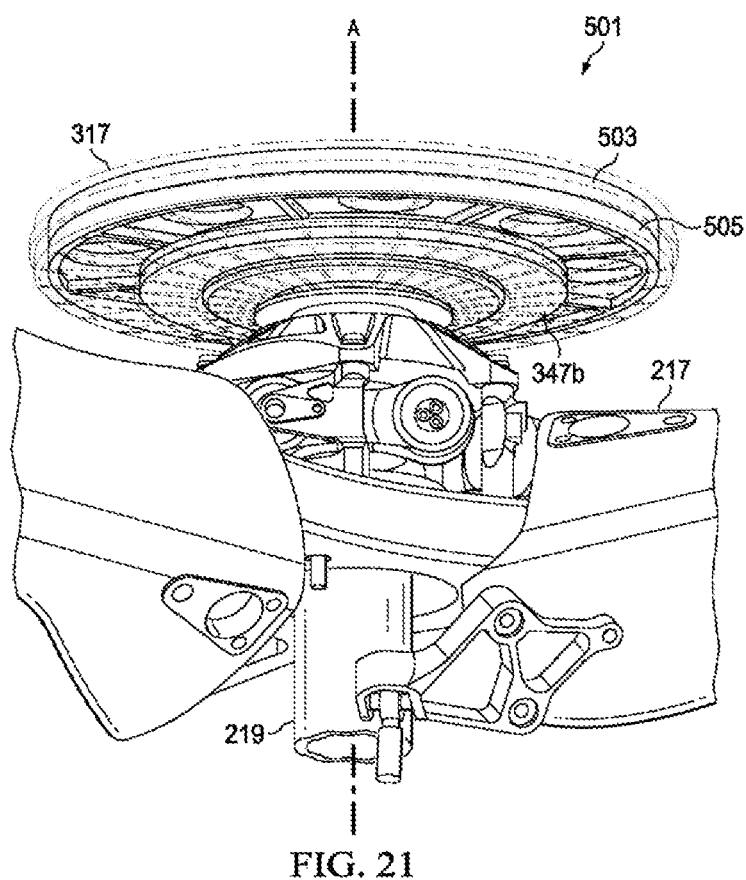
FIG. 21 shows a lower-perspective view of the vibration attenuation system shown in FIG. 19, but with components thereof removed for clarity.

Operational control preferably includes controlling the relative positions of the weight assemblies 403 and 405 between the positions shown in FIGS. 15 and 18 in order to counteract vibrations in the mast 219. Control system 343 provides control signals to motors 347a and 347b, which in turn drive the rotational positions of the weight assemblies 403 and 405, respectively.

Control system 343 and/or vibration attenuator 401 may be provided with "fail-off" features to prevent vibration attenuator 401 from inducing unintended and undesirable vibrations in the event of failure of one or more components of the vibration attenuation system. Inputs to control system may include aircraft gross weight, load factor, altitude, airspeed, and rpm. In addition, control system 343 may be optimized for use on tiltrotor aircraft 201 by also basing commands on the angle of nacelles 203 and other tiltrotor-specific parameters. Use of control system 343 to control vibration attenuator 401 means that attenuator 401 is less susceptible to transients, such as gusts, than prior UREKA systems and is not dependent on the dynamic characteristics of the mast. Also, since the vibration attenuator 401 can be proportionally self-exciting as described above, the self-exciting mode can be engaged in the event of a failure in the control system 343; similarly, the control system 343 can be used in the event of a failure in the self-excitation mode of the vibration attenuator 401.

Turning next to FIGS. 19-22, an alternative embodiment is shown of a vibration attenuator 501. From a theoretical standpoint, the vibration attenuator 501 operates to attenuate vibrations in the mast 219 in a manner similar to that described in connection with vibration attenuator 301. Like the vibration attenuator 301, the vibration attenuator 501 is disposed within a housing 317 that is fixed to the mast 219, and therefore rotates with the mast 219. Also like the vibration attenuator 301, the vibration attenuator 501 includes weight that can rotate relative to the mast 219 for countering vibrations in the mast 219; however, unlike the vibration attenuator 301, the vibration attenuator 501 includes plural weights: first weight assembly 503 and second weight assembly 505. Each of the first and second weight assemblies 503 and 505 includes a respective disk-shaped body having a respective one of first and second concentrated mass regions 503a and 505a. The first and second concentrated mass regions 503a and 505a can be cylindrical elements as illustrated or can have other shapes. The first and second concentrated mass regions 503a and 505a serve as weights such that the bulk of the weight of the first and second weight assemblies 503 and 505 is provided by the first and second concentrated mass regions 503a and 505a, respectively.

Figure 22:
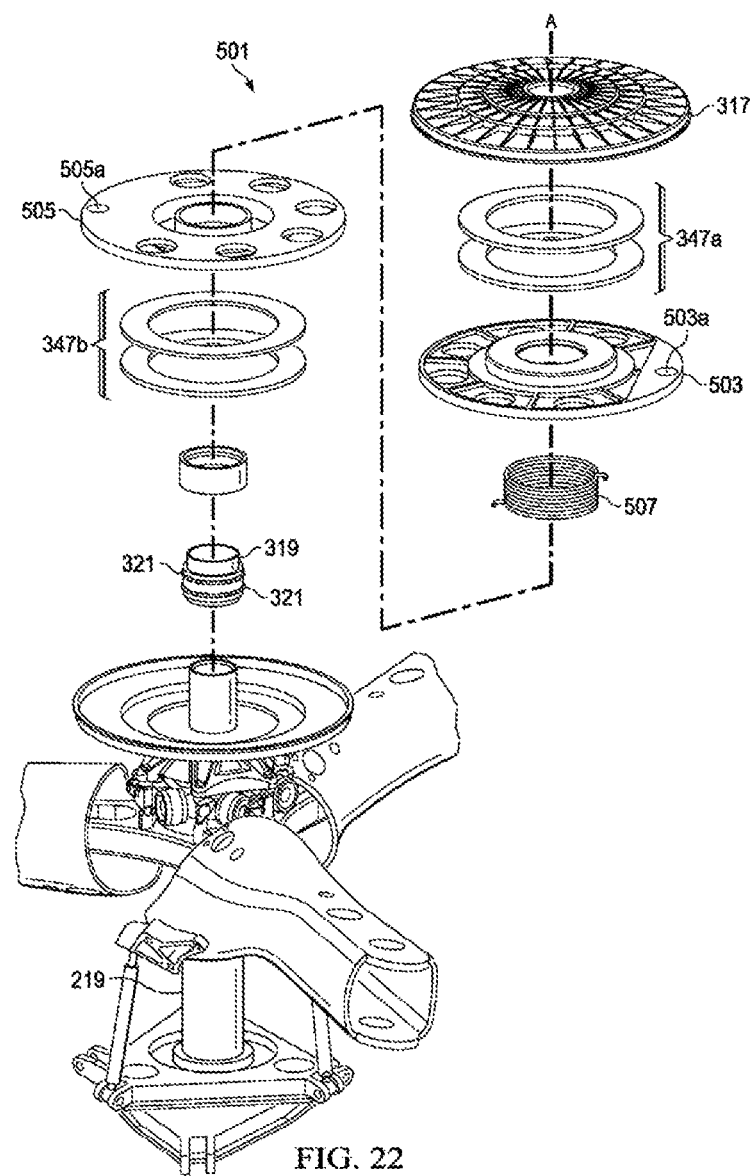
FIG. 22 shows an exploded view of the vibration attenuation system shown in FIG. 19.

The first and second weight assemblies 503 and 505 are both attached to a torsion spring 507, which constitutes an embodiment of a resilient element, and which urges the first and second weight assemblies 503 and 505 toward the positions shown in FIG. 22 where the first and second concentrated mass regions 503a and 505a are 180 degrees apart about the rotational axis A of the mast 219. It will be appreciated that alternative embodiments can include other types of resilient elements other than the illustrated torsion spring 507 that perform the same function as the torsion spring 507. The spring 507 is preferably selected such that its torsional spring rate can be overcome by self-excitation of the first and second weight assemblies 503 and 505, but the first and second weight assemblies 503 and 505 are still affected by the urging of the spring 507 toward the neutral position.

A control system such as control system 343 described above can be provided on the aircraft for controlling the parameters of operation of vibration attenuator 501, including the positioning of the first and second weight assemblies 503 and 505, speed of rotation, direction of rotation, and phasing of the shear forces relative to the position of the rotor. As described above, the control system 343 can be a microprocessor-based control system located, for example, in the fuselage. The control system 343 preferably comprises feedback sensors, such as feedback sensors 345 located on the aircraft, such as on the fuselage, wings, and/or nacelles, to provide vibration feedback data. Use of feedback sensors 345 allows control system 343 to control the operation of vibration attenuator system 501 based on measurements of vibrations transmitted into and through the airframe. Control system 343 may alternatively control operation of vibration attenuator 501 based on other data, such as airspeed, rotor speed, blade pitch angle, nacelle angle, amount of rotor thrust, and/or similar parameters.

Operational control preferably includes controlling the relative positions of the first and second weight assemblies 503 and 505 in order to counteract vibrations in the mast 219. Control system 343 provides control signals to motors 347a and 347b, which in turn drive the rotational positions of the first and second weight assemblies 503 and 505, respectively.

The first and second weight assemblies 503 and 505 are free to orbit at N/REV, which can be a higher rotational frequency than the 1/REV motion of the mast 219, while the first and second weight assemblies 503 and 505 self-position themselves. While the mast 219 is rotating, vibrations in the mast 219 and the rotation of the mast 219 will cause the first and second weight assemblies 503 and 505 to tend to rotate relative to each other such that the first and second concentrated mass regions 503a and 505a are rotated toward each other when the N/REV mast vibration is at a frequency close to the spring mass tuning of the weight assemblies. Generally the first and second weight assemblies 503 and 505 will rotate past a position that would be optimal for attenuating vibrations in the mast 219 due to the tuning of the spring mass system and the fact that the system functions over the 1/rev frequency. The motors 347a and 347b can be used to drive the first and second weight assemblies 503 and 505 in rotation toward, or away from, neutral positions shown in FIG. 22, until the first and second weight assemblies 503 and 505 are in at least somewhat optimal positions for attenuating vibrations in the mast 219. Since the spring 507 urges the first and second weight assemblies 503 and 505 back toward the neutral positions unless influenced by the n/rev mast vibration of the mast, the spring 507 acts to assist the motors 347a and 347b in obtaining the optimal location for the weights relative to the n/rev vibration, thereby reducing the amount of work required of the motors 347a and 347b to adjust the rotational positions of the first and second weight assemblies 503 and 505.

Control system 343 and/or vibration attenuator 501 may be provided with "fail-off" features to prevent vibration attenuator 501 from inducing unintended and undesirable vibrations in the event of failure of one or more components of the vibration attenuation system. Inputs to control system may include aircraft gross weight, load factor, altitude, airspeed, and rpm. In addition, control system 343 may be optimized for use on tiltrotor aircraft 201 by also basing commands on the angle of nacelles 203 and other tiltrotor-specific parameters. Use of control system 343 to control vibration attenuator 501 means that attenuator 501 is less susceptible to transients, such as gusts, than prior systems and is not dependent on the dynamic characteristics of the mast. Also, since the vibration attenuator 501 can be self-exciting as described above, the self-exciting mode can be engaged in the event of a failure in the control system 343; similarly, the control system 343 can be used in the event of a failure in the self-excitation mode of the vibration attenuator 501.

Figure 25:
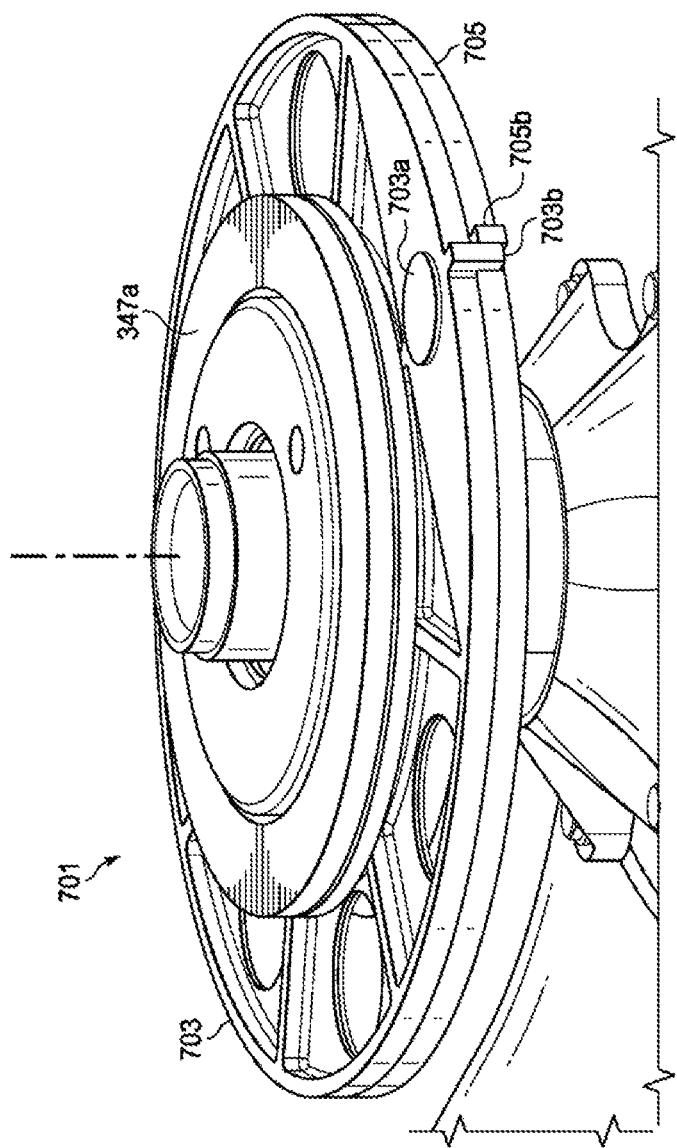
FIG. 25 shows an upper-perspective view of a modified version of the embodiment shown in FIGS. 19-22.
Figure 26:
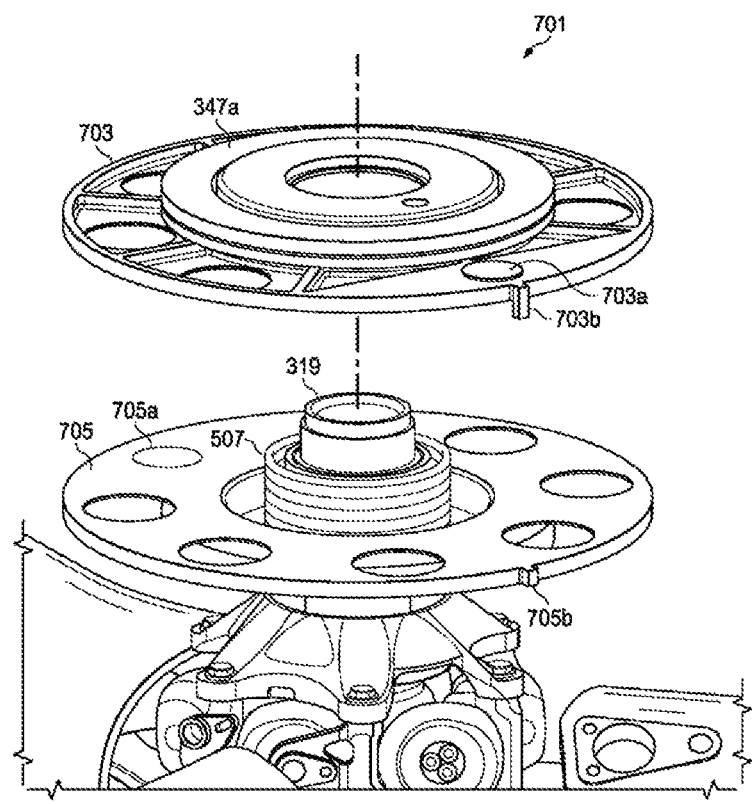
FIG. 26 shows an exploded view of the embodiment shown in FIG. 25.
Figure 27:
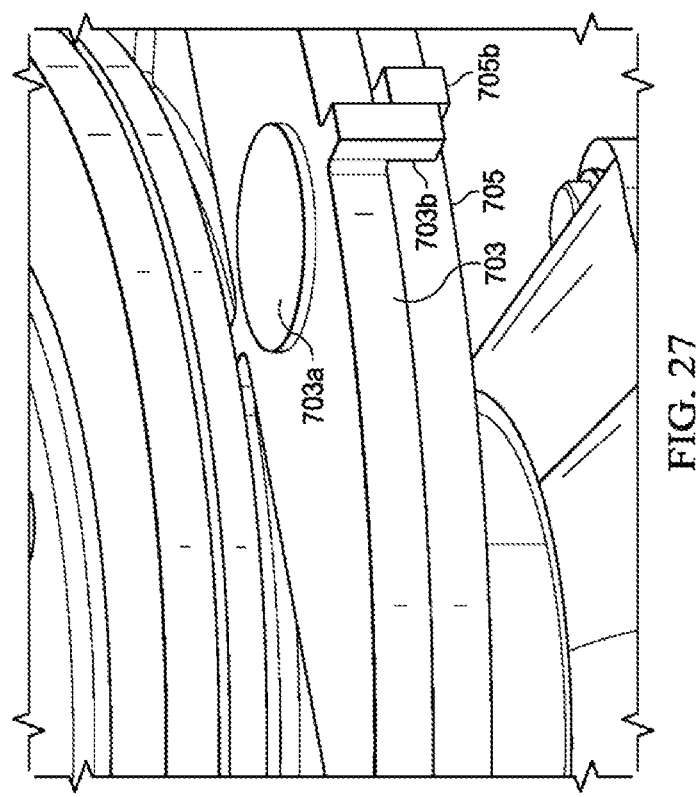
FIG. 27 shows an enlarged view of a portion of FIG. 25.

Alternatively, the embodiment shown in FIGS. 19-22 can be modified as shown in FIGS. 25-27, which constitutes an alternative embodiment of the vibration attenuator 501 that is designated as vibration attenuator 701. The vibration attenuator 701 can be substantially the same as vibration attenuator 501 except that the vibration attenuator 701 includes a first stop member 703b and a second stop member 705b. More specifically, the vibration attenuator 701 includes a first weight assembly 703 in place of the first weight assembly 503, and includes a second weight assembly 705 in place of the second weight assembly 505. The first weight assembly 703 includes a first concentrated mass region 703a and the first stop member 703b; the second weight assembly 705 includes a second concentrated mass region 705a and the second stop member 705b. The description of the first and second concentrated mass regions 503a and 505a applies equally to the first and second concentrated mass regions 703a and 705a.

The first and second stop members 703b and 705b extend from the outer peripheries of the first and second weight assemblies 703 and 705, respectively. The first and second stop members 703b and 705b are provided for stopping the relative rotation of the first and second weight assemblies 703 and 705 and for preventing the relative rotation of the first and second weight assemblies 703 and 705 beyond where the first and second concentrated mass regions 703a and 705 are +/−180 degrees relative azimuth to each other as best shown in FIG. 26. The stop feature provided by the first and second stop members 703b and 705b is desirable because if a motor 347a or 347b fails, the other motor 347a or 347b can stop both of the first and second weight assemblies 703 and 705 with the concentrated mass regions 703a and 705a set to be 180 degrees apart such that the net output of the first and second weight assemblies 703 and 705 is zero as the motor 347a or 347b is bringing the vibration attenuator 701 to a stop.

Figure 23:
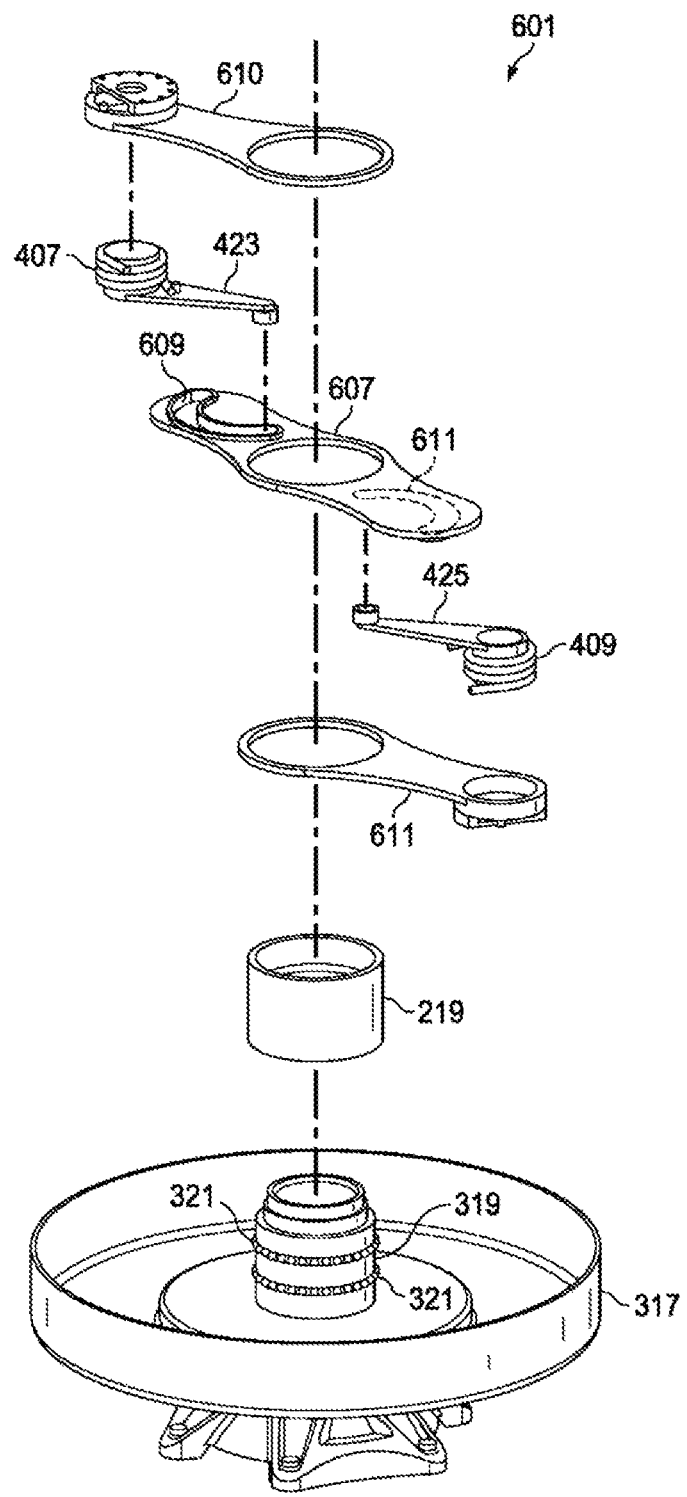
FIG. 23 shows an exploded view of an alternative embodiment of a vibration attenuation system according to the present disclosure.
Figure 24:
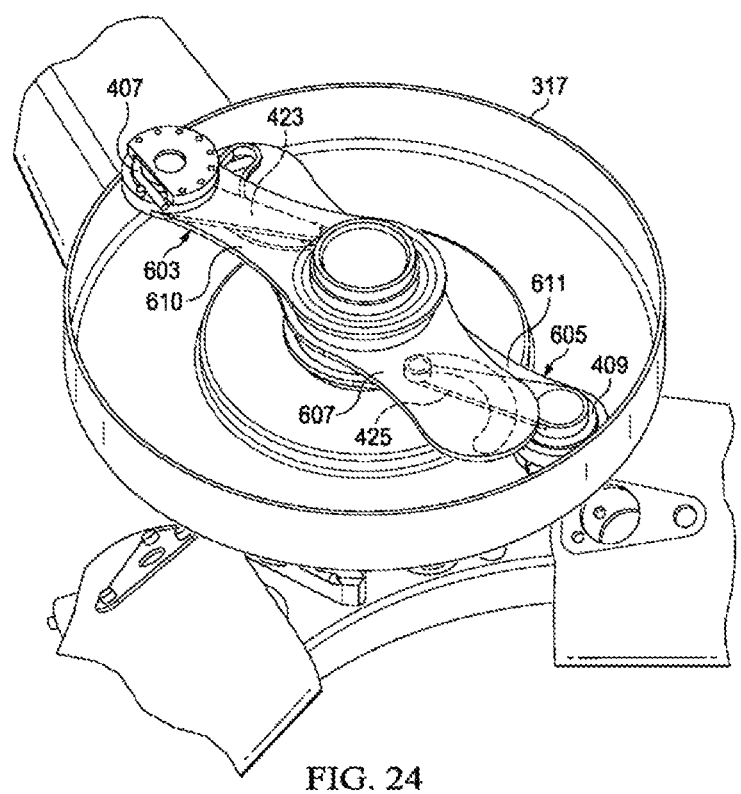
FIG. 24 shows an isolated, upper-perspective view of a portion of a proprotor assembly that includes the alternative embodiment of a vibration attenuation system shown in FIG. 23.

Turning next to FIGS. 23 and 24, an alternative embodiment is shown of a vibration attenuator 601. The vibration attenuator 601 is similar to the vibration attenuator 401 shown in FIGS. 15-18, except that the vibration attenuator 601 includes weight assemblies 603 and 605 and intermediate plate 607 in place of the weight assemblies 403 and 405 in vibration attenuator 401.

The weight assemblies 603 and 605 include a mechanical interconnecting mechanism so that each weight assembly receives feedback regarding the position of the other weight, and the rotational motion of each weight takes into account the activity of the other weight. In the illustrated embodiment, each of the weight assemblies 603 and 605 includes a respective extension portion 610 and 611, and the intermediate plate 607 includes a pair of guide slots 609 and 611 on opposing sides thereof. The extension portion 610 extends between the mast 219 and an armature 423. The extension portion 611 extends between the mast 219 and an armature 425. The armature 423 is fixed to the weight assembly 603 and extends to and into the guide slot 609 of the intermediate plate 607, and the armature 425 is fixed to the weight assembly 605 and extends to and into the guide slot 611 of the intermediate plate 607.

The armature 423 is rotatable relative to the extension portion 610, and the armature 425 is rotatable relative to the extension portion 611. However, the spring 407 urges the armature 423 to rotate in a first direction relative to the extension portion 610, where the first direction is counterclockwise in the top-down view shown in FIG. 24. Also, the spring 409 urges the armature 425 to rotate in a second direction relative to the extension portion 611, where the second direction is clockwise in the top-down view shown in FIG. 24. Thus, the springs 407 and 409 both urge the distal ends of respective armatures 423 and 425 towards the mast 219. The guide slots 609 and 611 each define optimal arc-shaped paths which create the desired spring rate curves that extend between a first end that is relatively closer to the mast 219 and a second end that is relatively further from the mast 219. Thus, since the armatures 423 and 425 have fixed lengths, the rotation of the armature 423 relative to the extension portion 610 causes the second weight assembly 605 to rotate about the mast 219, and similarly the rotation of the armature 425 relative to the extension portion 611 causes the first weight assembly 603 to rotate about the mast 219. In this way, the weight assemblies 603 and 605 are mechanically linked by the armatures 423 and 425 and intermediate plate 607.

The weight assemblies 603 and 605 are free to orbit at N/REV, which is a higher rotational frequency than the 1/REV motion of the mast 219. As the weight assemblies 603 and 605 rotate about the mast 219, the weight assemblies 603 and 605 will tend to position themselves as vibrations occur in the mast 219 against the urging of the springs 407 and 409 between the position shown in FIG. 24 where the two weights are about 180 degrees apart from each other, and a position similar to that shown in FIG. 18 where the two weights are somewhat aligned with each other, resulting in the maximum force to attenuate vibrations in the mast 219.

In some embodiments, a control system such as control system 343 described above can be provided on the aircraft for controlling the parameters of operation of vibration attenuator 601, including the positioning of weight assemblies 603 and 605, speed of rotation, direction of rotation, and phasing of the shear forces relative to the position of the rotor. As described above, the control system 343 can be a microprocessor-based control system located, for example, in the fuselage. The control system 343 preferably comprises feedback sensors, such as feedback sensors 345 located on the aircraft, such as on the fuselage, wings, and/or nacelles, to provide vibration feedback data. Use of feedback sensors 345 allows control system 343 to control the operation of vibration attenuator system 601 based on measurements of vibrations transmitted into and through the airframe. Control system 343 may alternatively control operation of vibration attenuator 401 based on other data, such as airspeed, rotor speed, blade pitch angle, nacelle angle, amount of rotor thrust, and/or similar parameters.

Operational control preferably includes controlling the relative positions of the weight assemblies 603 and 605 in order to counteract vibrations in the mast 219. Control system 343 provides control signals to motors, such as motors 347a and 347b shown in FIG. 15, which in turn drive the rotational positions of the weight assemblies 603 and 605, respectively.

Control system 343 and/or vibration attenuator 601 may be provided with "fail-off" features to prevent vibration attenuator 601 from inducing unintended and undesirable vibrations in the event of failure of one or more components of the vibration attenuation system. Inputs to control system may include aircraft gross weight, load factor, altitude, airspeed, and rpm. In addition, control system 343 may be optimized for use on tiltrotor aircraft 201 by also basing commands on the angle of nacelles 203 and other tiltrotor-specific parameters. Use of control system 343 to control vibration attenuator 601 means that attenuator 601 is less susceptible to transients, such as gusts, than prior UREKA systems and is not dependent on the dynamic characteristics of the mast. Also, since the vibration attenuator 601 can be self-exciting as described above, the self-exciting mode can be engaged in the event of a failure in the control system 343; similarly, the control system 343 can be used in the event of a failure in the self-excitation mode of the vibration attenuator 601.

Thus, like vibration attenuator 401, the vibration attenuator 601 operates to attenuate vibrations in the mast 219 in a manner similar to that described in connection with vibration attenuator 301. Like the vibration attenuator 301, the vibration attenuator 601 is disposed within a housing 317 that is fixed to the mast 219, and therefore rotates with the mast 219. Also like the vibration attenuator 301, the vibration attenuator 601 includes weight that can rotate relative to the mast 219 for countering vibrations in the mast 219; however, unlike the vibration attenuator 301, the vibration attenuator 601 includes plural weights—weight assemblies 603 and 605—that are each associated with a respective one of torsion springs 407 and 409, which urge the weight assemblies 603 and 605 toward the positions shown in FIG. 24.

The vibration attenuation system described herein can be implemented in still further embodiments. Some embodiments, can be limited to a totally passive system that includes a radial spring-mass system attached to a rotor hub such that the mass is free to spin in reaction to the rotation of the hub and vibrations in the hub. In some such embodiments the mass can be free to spin N/REV which is above 1/REV of the mast; in alternative embodiments, the mass can be configured to spin up to close to the frequency of the spinning of the mast. In some embodiments, the system can include motors or the like to influence the spinning of the mass, such as the frequency and phase of the spinning, based on inputs received from a control system, which in turn can be configured to provide such inputs based on inputs received from one or more sensors. In some embodiments, a device such as an actuator can be provided for influencing the spring rate of the spring-mass system. In some embodiments, a device such as an actuator can be provided to adjust the radius of the mass of the spring-mass system. In some embodiments, the vibration attenuation system can be mounted on a stand pipe or the like that does not spin with the mast and does not require a slip-ring or the like for wiring to and from the vibration attenuation system. In some embodiments, the vibration attenuation system can be mounted on the yoke or Hub so they are free to stay in the plane of the rotor as it flaps relative to the mast 219.

In any of the above-described embodiments, the spring-mass system can include two or more weights that both are free to rotate about the mast. In some such embodiments, the two or more weights of the spring-mass system can also be free to change phase relative to that of the spinning mast, thereby changing the effective radius of the total mass of the spring-mass system. Alternatively, some such embodiments can include one or more actuators or the like for influencing the spin of the two or more weights, such as the phase or effective radius of the weights, either by influencing both weights together or by influencing each weight independently one at a time.

Still further embodiments can include multiple sets of these devices to attenuate more than one n/rev frequency in the mast 219.

Still further embodiments can include a single spinning plate that is spun by a motor. One or more spring-assisted swing arms can be attached to the plate and can move either passively or by the action of a second motor to position the weights to achieve zero to maximum output for cancelling vibrations in the mast 219. In some such embodiments, the swing arms can pivot about an axis that is on the plate and is not coaxial to the center of rotation of the mast.

In some embodiments disclosed herein that include a motor, alternative means of actuating of the weight assembly's radial position can be used in addition to, or in place of, a motor that spins about the center of the mast. For example, an actuator can be used that pushes along the axis of rotation (parallel to the mast center line) or lateral shift.

In some embodiments, the shifting weight can include or be comprised of a mass that moves out of plane, or in a plane that is not normal to the axis A of the mast. For example, some embodiments can include a swing arm that swings out of plane from a revolving plate in order to position a weight for attenuating vibrations in the mast 219.

In some embodiments, the shifting weight can include or be comprised of a system of spinning masses with a hydraulic motor (either intermeshing gear motor or radial vain motor) with and without a spring to off load the force needed to spin the masses. The spinning masses can provide the positioning weight for attenuating vibrations in the mast 219.

Still further embodiments can include a fluid as the mass in a housing that uses a spring mechanism to position the fluid proportionally to the n/rev vibration in the mast 219.

Still further embodiments can include permanent magnets or electro magnets to provide the spring force that influences the location of the weights.

Whereas the above embodiments are shown and described as being used for in-plane rotor vibrations, other embodiments may also, or alternatively, be configured for use with attenuation of vibrations in the frame of an aircraft.

Figure 28:
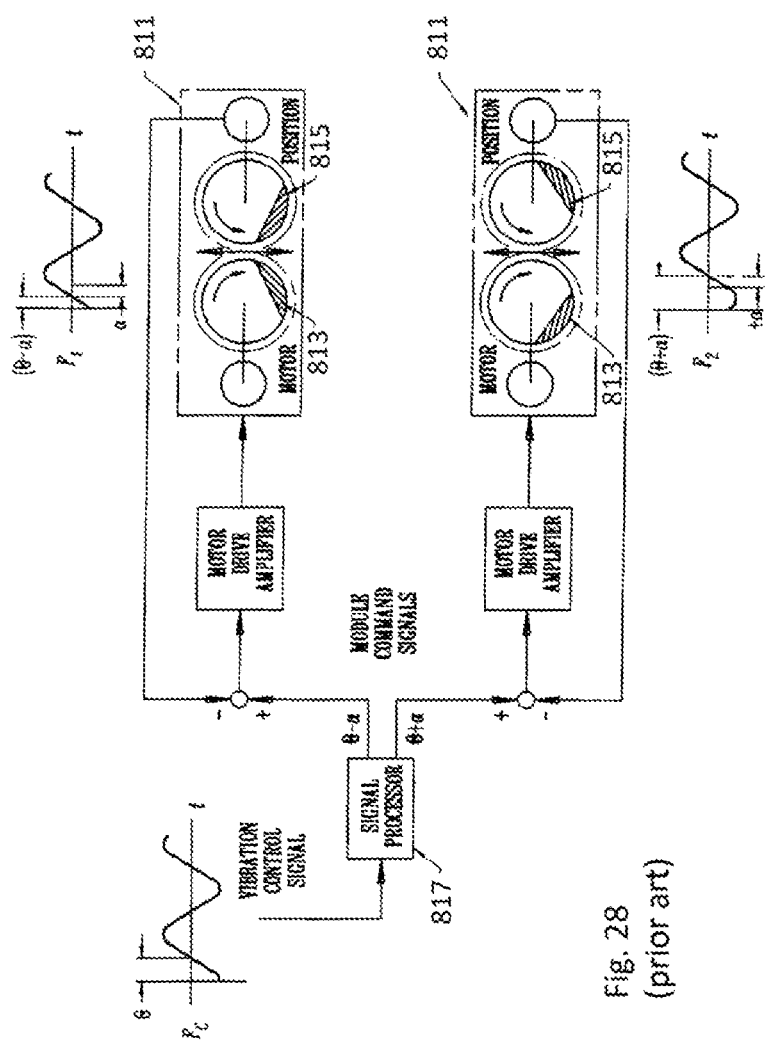
FIG. 28 illustrates a prior-art force generator.

Referring to Prior Art FIG. 28 in the drawings, as shown and described in U.S. Pat. No. 5,903,077, a force generator is adapted to be mounted on a helicopter fuselage and operated to selectively apply a controllable vibratory force thereto. Force-generating modules 811 each have a pair of counter-rotating eccentric masses 813, 815 arranged to exert a fixed-amplitude, variable-phase individual force at spaced locations on the fuselage. The eccentric portion of each mass 813, 815 is located a fixed distance from the corresponding axis of rotation. The individual forces combine to exert a controllable-amplitude resultant vibratory force on the structure, and the operation of modules 811 are controlled by a signal processor 817 in response to a vibration control signal.

Figure 29:
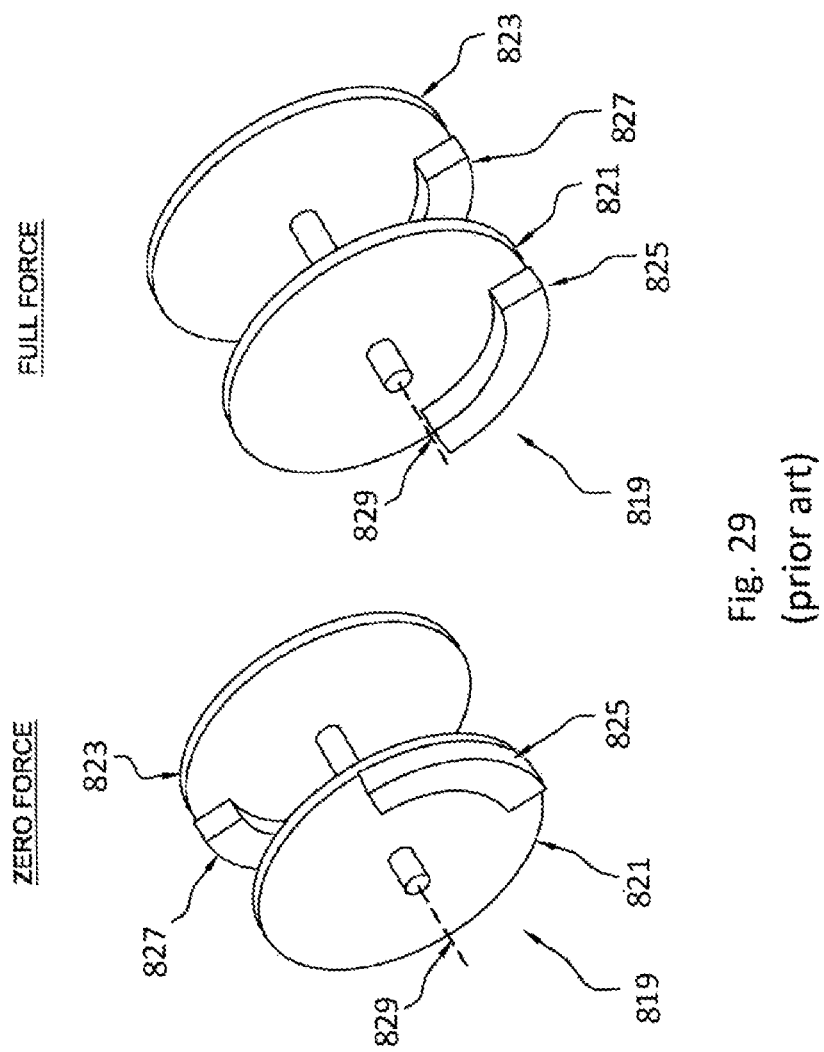
FIG. 29 illustrates a prior-art force generator.

Referring to Prior Art FIG. 29 in the drawings, as shown and described in U.S. Pat. No. 9,073,627, a force generator 819 has two co-rotating imbalanced rotors 821, 823 creating a circular force with controllable magnitude and phase. Each rotor 821, 823 has an eccentric mass 825, 827 that rotates together with the associated rotor 821, 823 about an axis 829, each mass 825, 827 being located on the associated rotor 821, 823 a fixed distance from axis 829. Rotors 821, 823 may be driven by separate motors (not shown), or rotors 821, 823 may both be driven by one motor and the phase between rotors 821, 823 adjusted by controllably forcing slippage across detents, such as magnet, ball, quill, or friction detents, coupling the rotors.

This disclosure divulges embodiments of spinning-mass vibration-reduction force generators, the generators preferably being optimized for use with rotary-wing aircraft. In some embodiments of the force generators disclosed herein, improved production and control of oscillatory forces is provided through adjustable-radius masses, allowing for control of the amplitude of the force. In some embodiments of the force generators disclosed herein, braking systems are used to control components of the generators when one portion is inoperable or to provide a desired fail-safe mode. In some embodiments, components are used to provide passive or partially active control of the generators. The force generators may be mounted to a fixed, non-rotating component, such as, for example, an airframe or a standpipe for a rotor mast, or the generators may be mounted to a rotating component, such as, for example, a rotor hub. The generators may be used in any orientation or combination to achieve the desired vibration reduction.

Each of the force generators disclosed herein uses a spinner to rotate an eccentric mass about an axis. While the spinners are shown and described herein as disks, it should be noted that other shapes or configurations of spinners may be used. Though described as having a particular number of spinners, each embodiment may have additional spinners. Also, multiple spinners of an embodiment may rotate in the same direction or in opposite directions.

Figure 30:
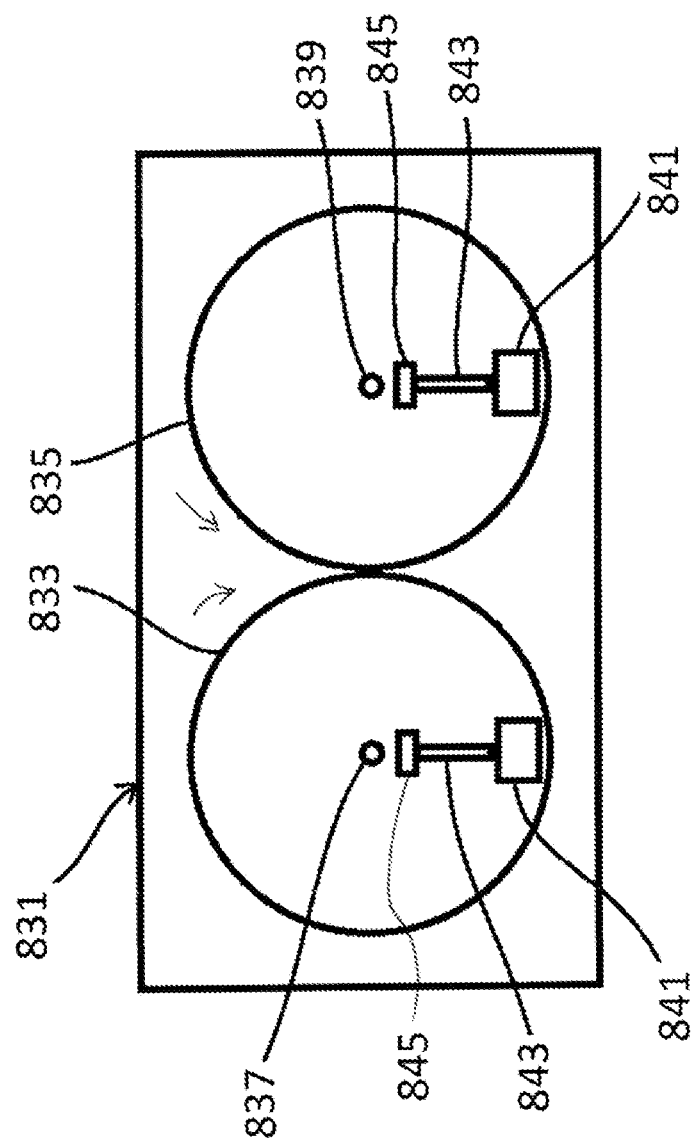
FIG. 30 illustrates a force generator according to this disclosure.

FIG. 30 illustrates a force generator 831 according to this disclosure and constructed similarly to module 811, shown and described in Prior Art FIG. 28. Generator 831 comprises two rotating disks 833, 835 that each rotate on an associated shaft 837, 839. As shown, disks 833, 835 are connected to each other to cause disks 833, 835 to counterrotate at the same angular speed, and this may be accomplished by gears, frictional contact, or other methods. Each disk 833, 835 has a mass 841 radially translatable relative to the associated disk 833. 835 along a shaft 843 by selective control of an actuator 845. This allows for changing the radial distance of each mass 841 from the axis of the associated shaft 837, 839, thereby allowing for control of the amplitude of the force generated by generator 831.

Figure 31:
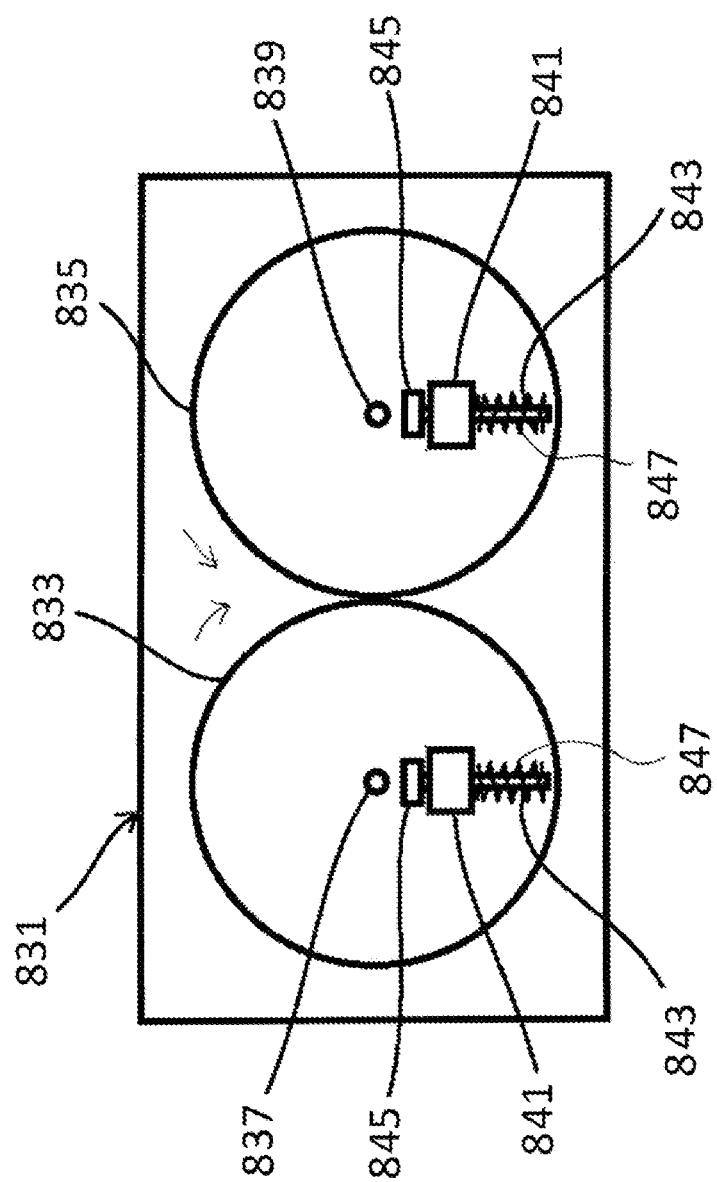
FIG. 31 illustrates an alternative embodiment of a force generator according to this disclosure.

FIG. 31 illustrates an alternative embodiment of generator 831, in which a spring 847 opposes radially outward translation of each mass 841 relative to the associated disk 833, 835. Springs 847 allow for a tuned system, which may be passive, active, or partially active. For example, actuator 845 may cause mass 841 to move outward a limited amount, with spring 847 controlling motion of mass 841 in a selected region. Though not shown, a spring may also or alternatively be used radially inward of mass 841, and this may provide for passive control of mass 841 from an intermediate radial position or allow for mass to be spring biased outward to a selected limiting position.

Figure 32:
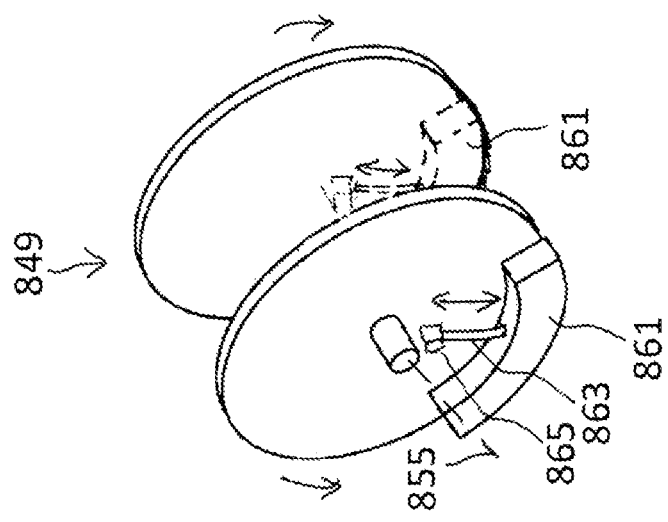
FIG. 32 illustrates another alternative embodiment of a force generator according to this disclosure.
Figure 33:
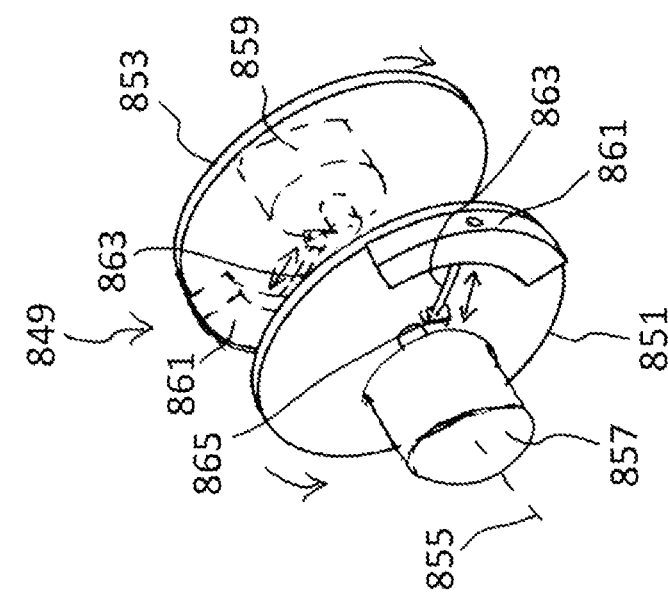
FIG. 33 illustrates another alternative embodiment of a force generator according to this disclosure.

FIGS. 32 and 33 illustrate a force generator 849, comprising two disks 851, 853, each driven in rotation about a central axis 855 by an associated motor 857, 859 (not shown in FIG. 33). Each disk 851, 853 has a mass 861 radially translatable relative to the associated disk 851, 853 along a shaft 863 by selective control of an actuator 865. This allows for changing the radial distance of each mass 861 from axis 855, thereby allowing for control of the amplitude of the force generated by generator 849. Also, motors 857, 859 may be operated at angular speeds that produce desired phasing of masses 861. FIGS. 32 and 33 show masses 861 located at the outermost radial position, with FIG. 32 showing a 180° phase position and FIG. 33 showing a 0° phase position.

Figure 34:
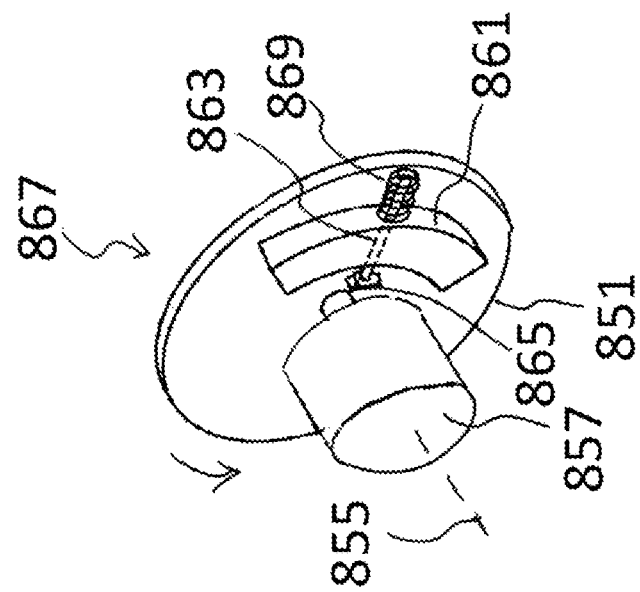
FIG. 34 illustrates another alternative embodiment of a force generator according to this disclosure.
Figure 35:
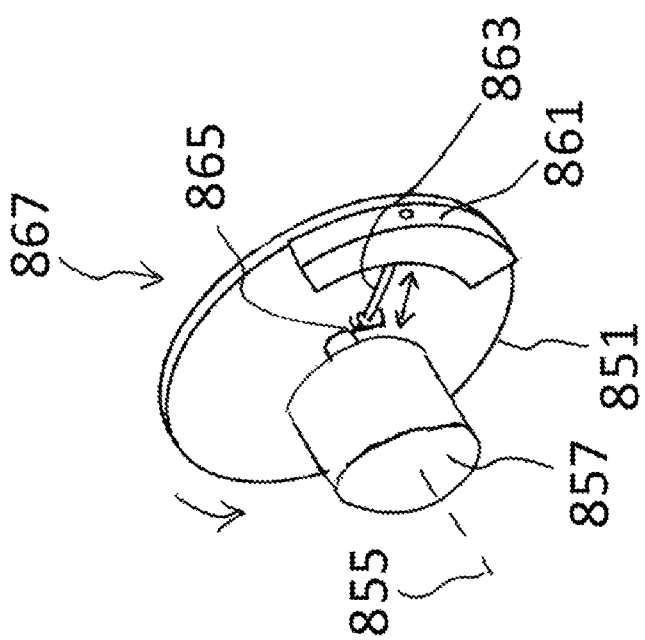
FIG. 35 illustrates another alternative embodiment of a force generator according to this disclosure.

FIGS. 34 and 35 illustrate embodiments of a single disk force generator 867, which is constructed similarly to one of the disk/motor assemblies of generator 849 of FIGS. 32 and 33. Generator 867 comprises one disk 851 driven in rotation about axis 855 by motor 857. Mass 861 is radially translatable relative to disk 851 along shaft 863 by selective control of actuator 865. This allows for changing the radial distance of mass 861 from axis 855, thereby allowing for control of the amplitude of the force generated by generator 849.

FIG. 35 illustrates an embodiment of generator 867 that includes a spring 869 that opposes radially outward translation of mass 861 relative to disk 851. Spring 869 allows for a tuned system, which may be passive, active, or partially active. For example, actuator 865 may cause mass 861 to move outward a limited amount, with spring 869 controlling motion of mass 861 in a selected region. Though not shown, a spring may also or alternatively be used radially inward of mass 861, and this may provide for passive control of mass 861 from an intermediate radial position or allow for mass to be spring biased outward to a selected limiting position. It should be noted that two-disk force generator 849 may also be configured to use springs in the same manner.

Figure 36:
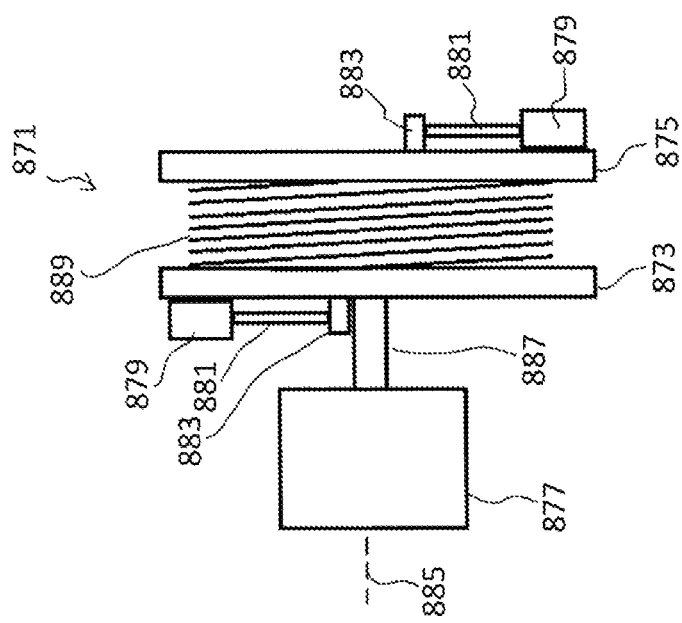
FIG. 36 illustrates another alternative embodiment of a force generator according to this disclosure.

FIG. 36 illustrates a force generator 871 with two coaxial disks 873, 875 driven by one motor 877. Each disk 873, 875 has a mass 879 radially translatable relative to the associated disk 873, 875 along a shaft 881 by selective control of an actuator 883. This allows for changing the radial distance of each mass 861 from axis 885, thereby allowing for control of the amplitude of the force generated by generator 871. Disk 873 is connected to shaft 887, and motor 877 drives shaft 887 and disk 873 in rotation about axis 885. Disk 875 is not directly driven by motor 877, but disk 875 is constrained to rotate about axis 885. A torsion spring 889 is located between and is coaxial with disks 873, 875 and transfers torque from disk 873 to disk 875. Spring 889 biases disk 875 relative to disk 873 about axis 885 to an angular orientation that positions masses 879 at 180° from each other, which is the position providing for no net force from generator 871. As a passive system, when force generator 871 is excited by a vibration, forces acting on mass 879 will tend to cause disk 875 to rotate about axis 885 relative to disk 873, producing an oscillatory force.

Figure 37:
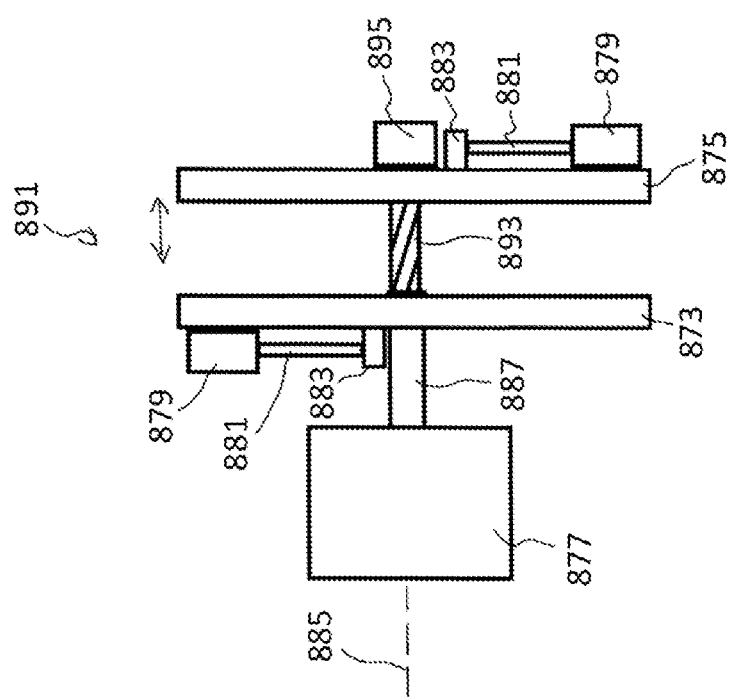
FIG. 37 illustrates another alternative embodiment of a force generator according to this disclosure.

FIG. 37 illustrates another embodiment of a force generator 891 with two coaxial disks 873, 875 driven by one motor 877, generator 891 being constructed similarly to generator 871. A helical shaft 893 connects disk 873 to disk 875, such that motor 877 drives both disks 873, 875 about axis 885. However, to allow for selective phasing of disks 873, 875 relative to each other about axis 885, disk 875 may be translated along helical shaft 893 toward and away from disk 873 by actuator 895. This translation causes disk 875 to change angular position relative to disk 873 while both are rotating about axis 885.

As shown and described for the embodiments above, generators 871 and 891 may incorporate springs for tuning and/or passive or partially active control of the radial position of masses 879.

FIGS. 38 through 43 illustrate embodiments of a spinning-mass force generator having eccentric masses in fixed positions.

Figure 38:
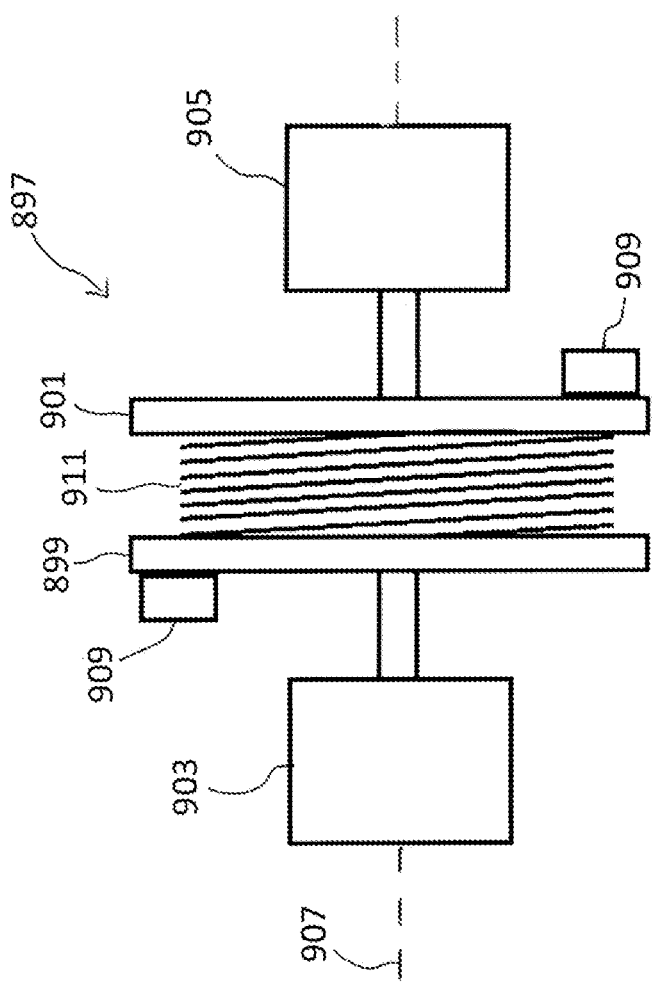
FIG. 38 illustrates another alternative embodiment of a force generator according to this disclosure.

FIG. 38 illustrates a force generator 897 having two disks 899, 901, each driven by a motor 903, 905, respectively, about an axis 907. A mass 909 is affixed to each disk 899, 901 for rotation together with the associated disk 899, 901 about axis 907, the masses being located a fixed radial distance from axis 907. Disk 899 is not directly driven by motor 905, and disk 901 is not directly driven by motor 903. A torsion spring 911 located between and coaxial with disks 899, 901 transfers torque between disks 899, 901 and biases disks 899, 901 about axis 907 to a relative angular orientation that positions masses 909 at 180° from each other, which is the position providing for no net force from generator 897. Force generator 897 may be operated as a fully active system or as a partially active system if one motor 903, 905 is inoperable. The use of spring 911 allows for continued operation of generator 897 with one motor 903, 905 inoperable or for a fail-safe way to stop operation of generator 897.

Figure 39:
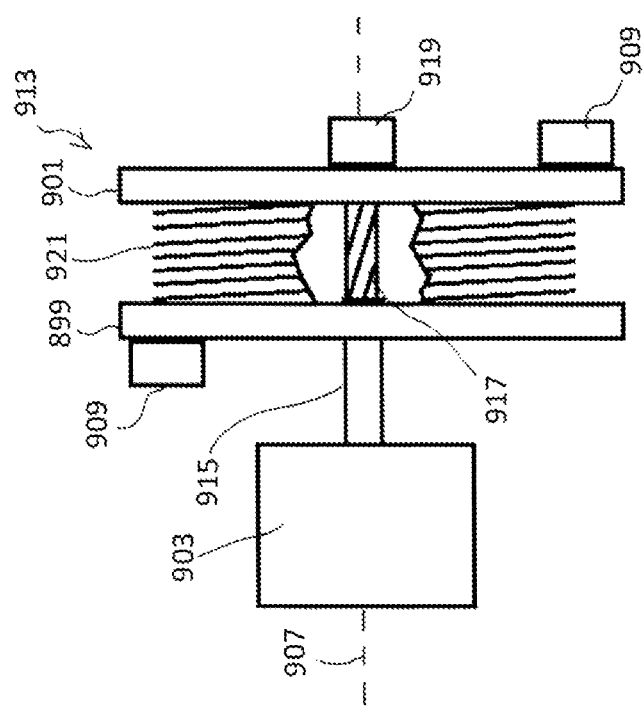
FIG. 39 illustrates another alternative embodiment of a force generator according to this disclosure.

FIG. 39 illustrates a force generator 913 constructed similarly to generator 891, as described above, but generator 913 has fixed-position masses, as described above for generator 897. Motor 903 drives a shaft 915 connected to disk 899. Helical shaft 917 connects disk 899 to disk 901, such that motor 903 drives both disks 899, 901 about axis 907. However, to allow for selective phasing of disks 899, 901 relative to each other about axis 907, disk 901 may be translated along helical shaft 917 toward and away from disk 899 by actuator 919. This translation causes disk 901 to change angular position relative to disk 899 while both are rotating about axis 907. In addition, generator 913 also comprises a torsion spring 921, as described above for generators 871 and 897. Spring 921 biases disk 901 relative to disk 899 about axis 907 to an angular orientation that positions masses 909 at 180° from each other, which is the position providing for no net force from generator 913. Spring 921 allows for partially active operation of generator 913.

Figure 40:
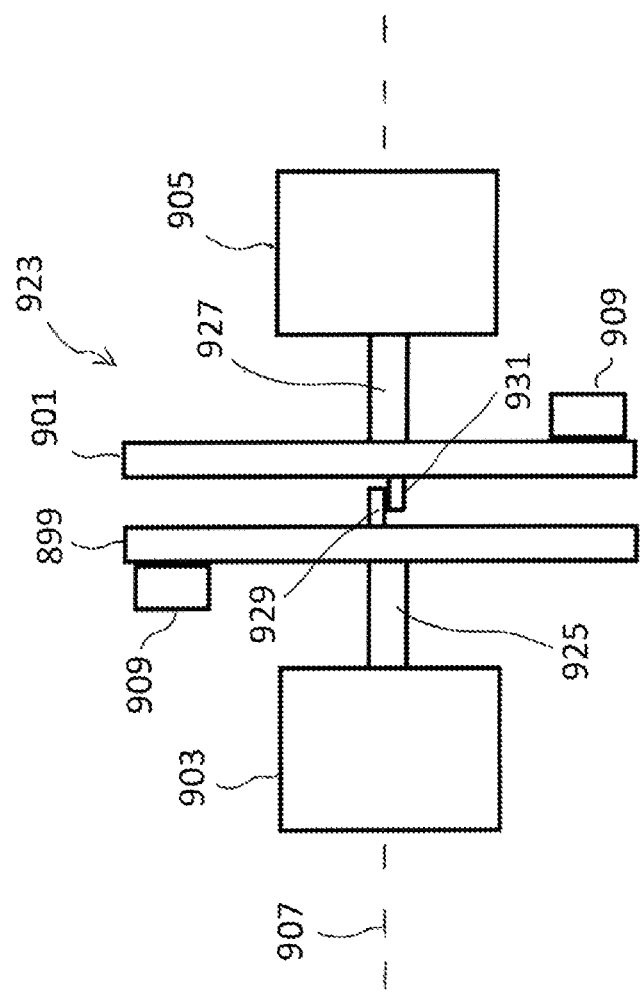
FIG. 40 illustrates another alternative embodiment of a force generator according to this disclosure.

FIG. 40 illustrates a force generator 923 constructed similarly to generator 897 of FIG. 38, though generator 923 lacks torsion spring 911. Motor 903 drives disk 899 through shaft 925, and motor 905 drives disk 901 through shaft 927. To allow for fail-safe operation of generator 923, a rigid stop 929 is mounted on disk 899 and positioned to engage a rigid stop 931 mounted to disk 901. Stops 929, 931 are located a radial distance from axis 907. When stops 929, 931 are engaged, disks 899, 901 are at a relative angular orientation that positions masses 909 at or near 180° (or −180°) from each other, which is the position providing for no net force from generator 923.

Figure 41:
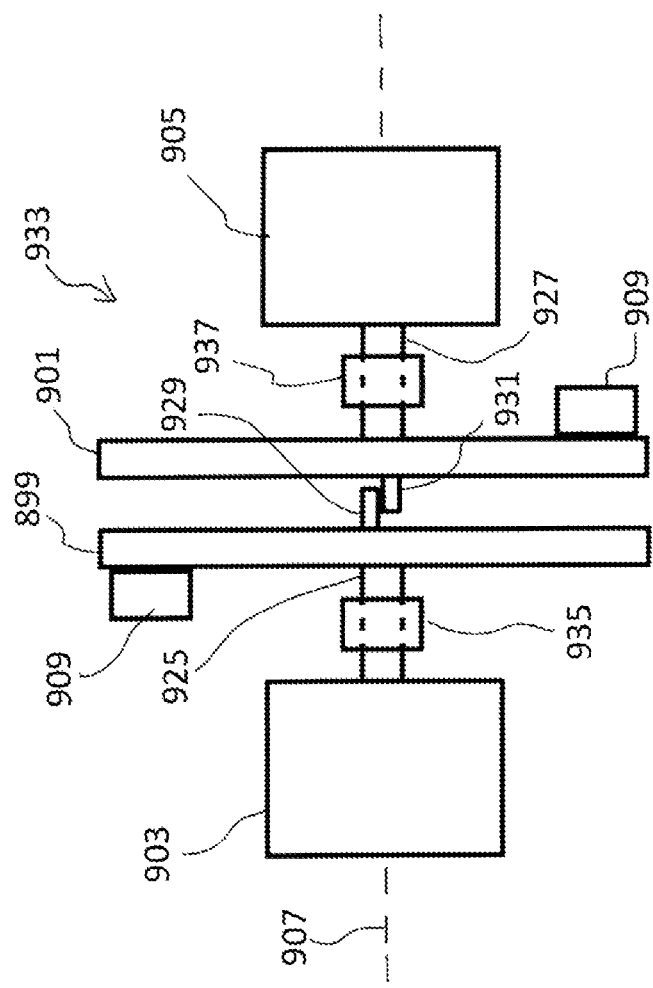
FIG. 41 illustrates another alternative embodiment of a force generator according to this disclosure.

FIG. 41 illustrates a force generator 933, which is constructed similarly to generator 923. Generator 933 comprises shaft brakes 935, 937 for independently and selectively applying a braking force to the associated shaft 925, 927. In the preferred embodiment, each brake 935, 937 is required to be energized to allow the associated shaft 925, 927 to rotate about axis 907. This allows for selectively stopping the rotation of one or both of disks 899, 901 and a fail-safe mode, in which brakes 935, 937 engage if electrical power is interrupted. Though not shown, brakes 935, 937 will be affixed to a nonrotating component, such as an airframe or standpipe, or brakes will be affixed to a rotating component, such as a rotor hub. Generator 933 is shown with optional stops 929, 931, which are described above.

Figure 42:
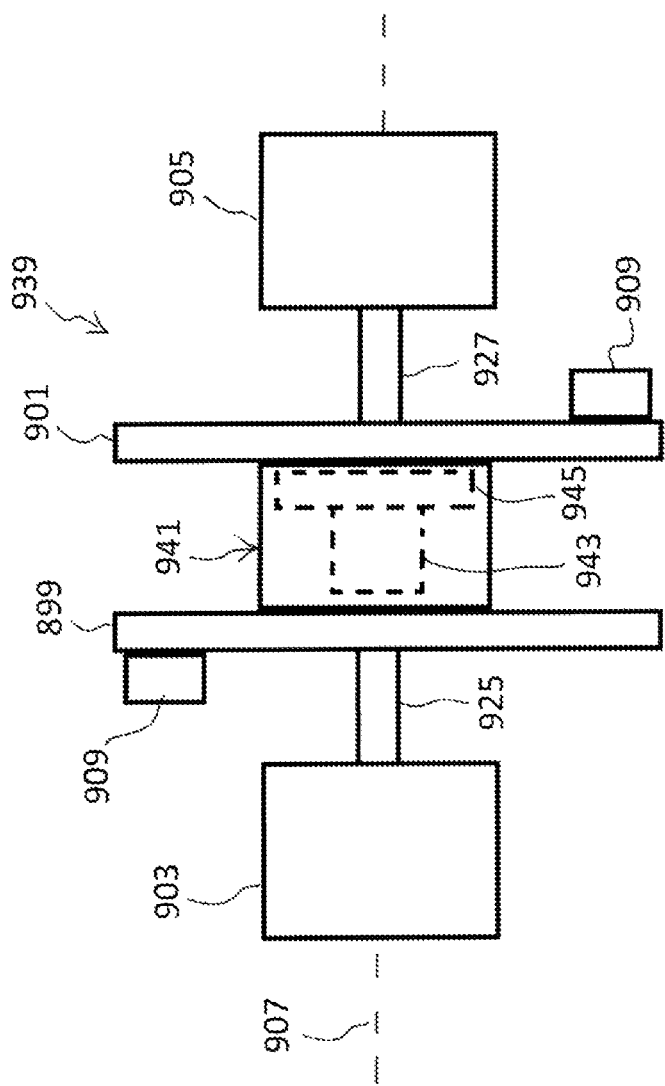
FIG. 42 illustrates another alternative embodiment of a force generator according to this disclosure.

FIG. 42 illustrates a force generator 939, which is constructed similarly to generator 923, as described above. Motor 903 drives disk 899 through shaft 925, and motor 905 drives disk 901 through shaft 927. To allow for fail-safe operation of generator 939, a friction brake 941 is coaxially mounted to disk 899 between disks 899, 901. Brake 941 rotates about axis 907 with disk 899 and comprises an actuator 943 and an axially translatable brake pad 945. Pad 945 is preferably biased toward disk 901 and preferably requires energizing of actuator 943 to disengage pad 945 from disk 901. During operation of generator 939, this configuration allows for disks 899, 901 to be rotated at different angular speeds. However, if power is lost to one of motors 903, 905, actuator 943 can be deenergized to allow pad 945 to engage disk 901, allowing for continued operation of generator 939 with one of motors 903, 905 driving both disks 899, 901. This also allows for actuator 943 to be used to selectively disengage pad 945 for phasing of disks 899, 901 or for controlled shutdown of generator 939 with both disks 899, 901 under control of the operable motor 903, 905.

Figure 43:
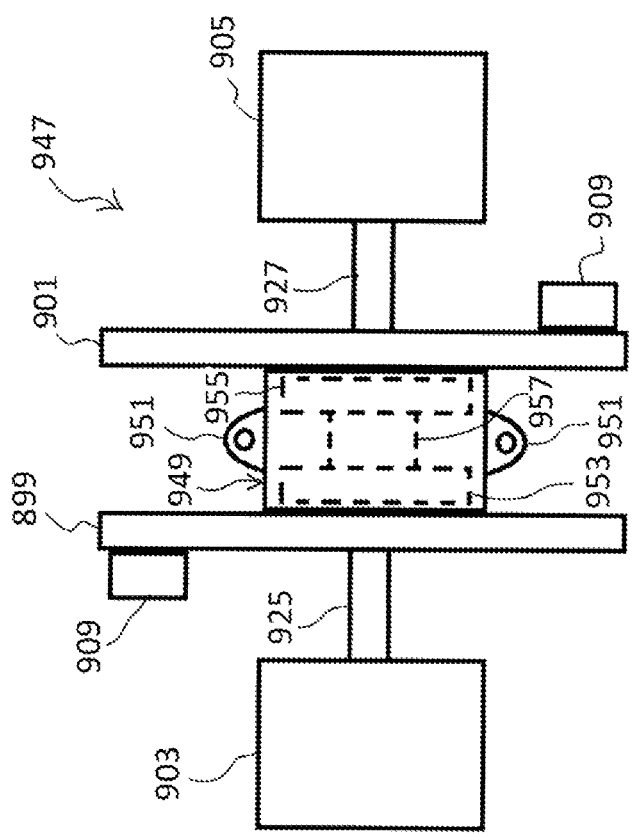
FIG. 43 illustrates another alternative embodiment of a force generator according to this disclosure.

FIG. 43 illustrates a force generator 947, which is constructed similarly to generator 939, as described above. Unlike friction brake 941, which rotates about axis 907 with disk 899, generator 947 comprises a friction brake 949 affixed to another component. For example, tabs 951 may be used to mount brake 949 to an airframe, standpipe, or rotor hub, and brake 941 does not rotate about axis 907 with either disk 899, 901. Brake 941 comprises two brake pads 953, 955, which are axially translatable along axis 907. Pad 953 is biased toward disk 899 and pad 955 is biased toward disk 901, and each pad 953, 955 engages the associated disk 899, 901 until moved inward by energizing one or both ends of actuator 957. When engaged with a disk 899, 901, each pad 953, 955 applies a braking force to stop the rotation or prevent rotation of the associated disk 899, 901.

For all embodiments comprising a variable-radius mass, it should be noted that all appropriate means for selectively controlling the radius of the mass may be used, including, for example, rotating shafts, slots, gears, linear actuators, and similar means of translating the mass. For all embodiments comprising a brake, it should be noted that any appropriate type of brake may be used, including, for example, clamping-style brakes that engage one or more shafts or one or both sides of a disk.

Any of the above-described embodiments can be implemented by replacing mechanical and/or electrical components shown in the drawings and described herein with fluid components. For example, the spring-mass system of the disclosed vibration attenuation system can be implemented entirely as a fluid system or as a combination of a fluid and mechanical system, or as a combination of a fluid, mechanical, and/or electrical system.

While various embodiments in accordance with the principles disclosed herein have been described above, it should be understood that they have been presented by way of example only, and are not limiting. Thus, the breadth and scope of the claims should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

What is claimed is:

1. A vibration isolation system for a rotary-wing aircraft main rotor system having a mast that is rotatable about an axis of rotation, the vibration isolation system comprising:
   a first weight assembly rotatable relative to the mast coaxially about the axis of rotation and having a disk-shaped body;
   a second weight assembly rotatable relative to the mast coaxially about the axis of rotation and having a disk-shaped body;
   a first stop member located on the first weight assembly; and
   a second stop member located on the second weight assembly;
   wherein the stop members are configured to contact each other for preventing the relative rotation of the first and second weight assemblies beyond a specified angular amount, and
   wherein the angular velocity of the first and second weight assemblies is operable to reduce in-plane vibration of the main rotor system.

2. The system of claim 1, further comprising:
   a resilient element mechanically linked to the first weight assembly and to the second weight assembly.

3. The system of claim 2, wherein the resilient element comprises a torsion spring.

4. The system of claim 1, wherein the first weight assembly includes a first concentrated mass region, and wherein the second weight assembly includes a second concentrated mass region.

5. The system of claim 4, wherein a resilient element is mechanically linked to the first and second weight assemblies so as to urge the first concentrated mass region to be 180 degrees apart from the second concentrated mass region.

6. The system of claim 1, wherein the first stop member extends from an outer periphery of the first weight assembly and the second stop member extends from an outer periphery of the second weight assembly.

7. An aircraft comprising:
   a rotary-wing aircraft main rotor system having a mast that is rotatable about an axis of rotation;
   a vibration isolation system comprising:
   a first weight assembly rotatable relative to the mast coaxially about the axis of rotation and having a disk-shaped body;
   a second weight assembly rotatable relative to the mast coaxially about the axis of rotation and having a disk-shaped body;
   a first stop member located on the first weight assembly; and
   a second stop member located on the second weight assembly;
   wherein the stop members are configured to contact each other for preventing the relative rotation of the first and second weight assemblies beyond a specified angular amount, and wherein the angular velocity of the first and second weight assemblies is operable to reduce in-plane vibration of the main rotor system.

8. The system of claim 7, further comprising:
a resilient element mechanically linked to the first weight assembly and to the second weight assembly.

9. The system of claim 8, wherein the resilient element comprises a torsion spring.

10. The system of claim 7, wherein the first weight assembly includes a first concentrated mass region, and wherein the second weight assembly includes a second concentrated mass region.

11. The system of claim 10, wherein a resilient element is mechanically linked to the first and second weight assemblies so as to urge the first concentrated mass region to be 180 degrees apart from the second concentrated mass region.

12. The system of claim 7, wherein the first stop member extends from an outer periphery of the first weight assembly and the second stop member extends from an outer periphery of the second weight assembly.

* * * * *